United States Patent
Smith

(10) Patent No.: US 12,466,066 B2
(45) Date of Patent: Nov. 11, 2025

(54) SOLAR PANEL DISPENSING DEVICE WITH VERTICAL SOLAR PANEL HOPPER LOADING AND DISPENSING

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/312,361

(22) Filed: May 4, 2023

(65) Prior Publication Data

US 2024/0367319 A1 Nov. 7, 2024

(51) Int. Cl.
*B25J 9/16* (2006.01)
*B25J 5/00* (2006.01)
(Continued)

(52) U.S. Cl.
CPC ............. *B25J 9/1669* (2013.01); *B25J 5/005* (2013.01); *B25J 9/162* (2013.01); *B65G 1/04* (2013.01);
(Continued)

(58) Field of Classification Search
CPC .......... B25J 9/1669; B25J 5/005; B25J 9/162; B65G 1/04; B66F 9/00; B66F 9/06;
(Continued)

(56) References Cited

U.S. PATENT DOCUMENTS 3,893,647 A 7/1975 Kennedy
4,611,090 A 9/1986 Catella et al.
(Continued)

FOREIGN PATENT DOCUMENTS

CN 205901664 U 1/2017
CN 109573509 A 4/2019
(Continued)

OTHER PUBLICATIONS

Enphase Energy, Installation and Operations Manual Enphase Micro-Inverter Models M190-72-208 and M190-72-240, https://s3.amazonaws.com/RealGoods/products/documentation/m190usermanual0-42680.pdf, 2009, 27 pages, Petaluma, California.
(Continued)

*Primary Examiner* — Michael Collins
(74) *Attorney, Agent, or Firm* — Thorpe North & Western, LLP

(57) ABSTRACT

A solar panel dispensing device comprising a hopper and a robotic arm. The hopper includes a base and a frame defining an interior volume and being configured to contain solar panels therein supported in an upright position. The robotic arm is moveable about the hopper in one or more degrees of freedom. The robotic arm includes a solar panel end effector operable to acquire a lead solar panel oriented in the upright orientation. The solar panel end effector includes an interfacing orientation and a release orientation; The robotic arm further includes an arm actuator operable to move the robotic arm and the solar panel end effector between the interfacing orientation and the release orientation. The interfacing orientation and the release orientation of the solar panel end effector correspond respectively to the solar panel being in the upright orientation, and the solar panel being in a presentation orientation.

27 Claims, 21 Drawing Sheets

(51) Int. Cl.
   *B60P 1/48* (2006.01)
   *B65G 1/04* (2006.01)
   *B66F 9/00* (2006.01)
   *B66F 9/06* (2006.01)
   *B66F 9/18* (2006.01)

(52) U.S. Cl.
   CPC .................. *B66F 9/00* (2013.01); *B66F 9/06* (2013.01); *B66F 9/18* (2013.01); *B60P 1/483* (2013.01); *Y10S 901/01* (2013.01); *Y10S 901/14* (2013.01); *Y10S 901/27* (2013.01)

(58) Field of Classification Search
   CPC .......... B66F 9/18; B60P 1/483; Y10S 901/01; Y10S 901/14; Y10S 901/27
   See application file for complete search history.

(56) References Cited

U.S. PATENT DOCUMENTS

| | | | |
|---|---|---|---|
| 6,325,749 | B1 | 12/2001 | Inokuchi et al. |
| 7,447,605 | B2 * | 11/2008 | Kuehnrich .............. G07F 11/54 702/105 |
| 8,522,490 | B1 | 9/2013 | Stancel |
| 8,567,134 | B1 | 10/2013 | Grushkowitz et al. |
| 9,733,646 | B1 | 8/2017 | Nusser et al. |
| 10,696,451 | B2 | 6/2020 | Britcher et al. |
| 10,801,755 | B1 | 10/2020 | Nemat et al. |
| 11,331,799 | B1 | 5/2022 | Shafer |
| 11,502,638 | B2 | 11/2022 | Watson et al. |
| 11,979,107 | B2 | 5/2024 | Watson et al. |
| 12,184,231 | B2 * | 12/2024 | Shelton ................... H02S 20/00 |
| 2008/0149170 | A1 | 6/2008 | Hanoka |
| 2009/0320389 | A1 | 12/2009 | White |
| 2010/0096073 | A1 | 4/2010 | Adriani et al. |
| 2011/0000544 | A1 | 1/2011 | West |
| 2011/0005581 | A1 | 1/2011 | Kanbara et al. |
| 2011/0073733 | A1 | 3/2011 | Hartelius et al. |
| 2011/0162639 | A1 | 7/2011 | Jeandeaud |
| 2011/0303262 | A1 | 12/2011 | Wolter |
| 2012/0027550 | A1 | 2/2012 | Bellacicco et al. |
| 2012/0048345 | A1 | 3/2012 | Wood et al. |
| 2012/0142221 | A1 | 6/2012 | Naskali |
| 2013/0019925 | A1 | 1/2013 | Britcher et al. |
| 2015/0093190 | A1 | 4/2015 | Header |
| 2015/0200621 | A1 | 7/2015 | Reed et al. |
| 2016/0190976 | A1 | 6/2016 | Corio et al. |
| 2016/0344330 | A1 | 11/2016 | Gillis |
| 2017/0229998 | A1 | 8/2017 | Molina et al. |
| 2017/0250648 | A1 | 8/2017 | Haas et al. |
| 2017/0359017 | A1 | 12/2017 | Corio |
| 2018/0072168 | A1 | 3/2018 | Heinen et al. |
| 2019/0074792 | A1 | 3/2019 | Hakenberg |
| 2019/0341878 | A1 | 11/2019 | Watson et al. |
| 2020/0274480 | A1 | 8/2020 | Lutian |
| 2020/0331737 | A1 | 10/2020 | Reischauer et al. |
| 2020/0350850 | A1 | 11/2020 | Di Stefano et al. |
| 2021/0180832 | A1 | 6/2021 | Schuknecht et al. |
| 2021/0189747 | A1 | 6/2021 | Pearson, Jr. |
| 2021/0205995 | A1 | 7/2021 | Vu et al. |
| 2021/0206003 | A1 | 7/2021 | Zhou et al. |
| 2021/0379757 | A1 | 12/2021 | Schneider et al. |
| 2021/0395011 | A1 | 12/2021 | Crawford, Jr. et al. |
| 2022/0035379 | A1 | 2/2022 | Xu et al. |
| 2022/0049805 | A1 | 2/2022 | Hinton |
| 2022/0069770 | A1 * | 3/2022 | Shelton ................... H02S 99/00 |
| 2022/0103122 | A1 | 3/2022 | Carter |
| 2022/0193927 | A1 | 6/2022 | Mazzetti, Jr. et al. |
| 2022/0345076 | A1 | 10/2022 | Nickerson |
| 2022/0411245 | A1 * | 12/2022 | Bailey ...................... B66F 9/087 |
| 2023/0066547 | A1 | 3/2023 | Campbell et al. |
| 2023/0188086 | A1 | 6/2023 | Garza et al. |
| 2023/0361715 | A1 | 11/2023 | Mouniandy et al. |
| 2024/0001836 | A1 | 1/2024 | Di Stefano et al. |
| 2024/0030863 | A1 * | 1/2024 | Brulo ....................... F24S 80/00 |
| 2024/0051152 | A1 | 2/2024 | Tadepalli et al. |
| 2024/0083699 | A1 | 3/2024 | Davis et al. |
| 2024/0190009 | A1 | 6/2024 | Asmari et al. |
| 2024/0228195 | A1 * | 7/2024 | Smith ...................... H02S 10/00 |
| 2024/0235460 | A1 * | 7/2024 | Smith ...................... H02S 20/30 |
| 2024/0235467 | A1 | 7/2024 | Conti et al. |
| 2024/0258958 | A1 | 8/2024 | Watson et al. |
| 2024/0367319 | A1 | 11/2024 | Smith |
| 2024/0424969 | A1 | 12/2024 | Hansel et al. |
| 2024/0424971 | A1 | 12/2024 | Hansel et al. |
| 2025/0164154 | A1 | 5/2025 | Morin et al. |
| 2025/0223118 | A1 | 7/2025 | Smith et al. |
| 2025/0226791 | A1 | 7/2025 | Smith et al. |
| 2025/0226792 | A1 | 7/2025 | Smith et al. |

FOREIGN PATENT DOCUMENTS

| | | |
|---|---|---|
| CN | 110402683 A | 11/2019 |
| CN | 211700658 U | 10/2020 |
| CN | 111342751 A | 7/2021 |
| DE | 102012105726 A1 | 1/2014 |
| JP | 2020-070584 A | 5/2020 |
| WO | WO 2019/136505 A1 | 7/2019 |
| WO | WO 2021/119559 A1 | 6/2021 |
| WO | WO 2021/229387 A2 | 11/2021 |
| WO | WO 2021/252427 A1 | 12/2021 |

OTHER PUBLICATIONS

SOS Engineering Inc, 11 Advantages of Spring Loaded Contacts, https://www.soseng.com/11-advantages-of-spring-loaded-contacts/, 2019, 5 pages.

* cited by examiner

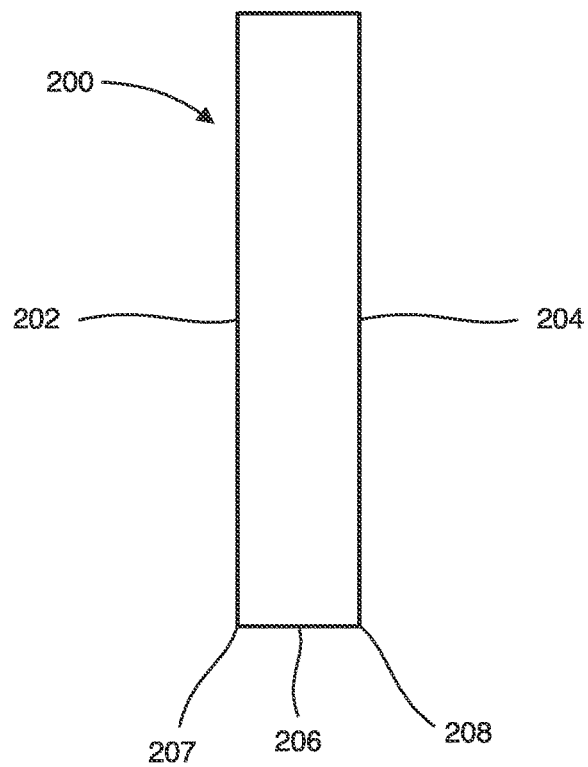
FIG. 2A
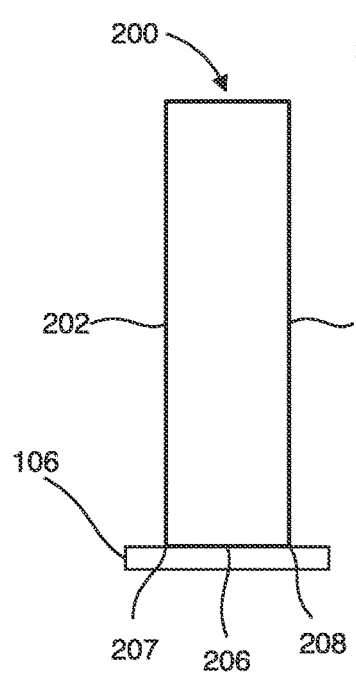 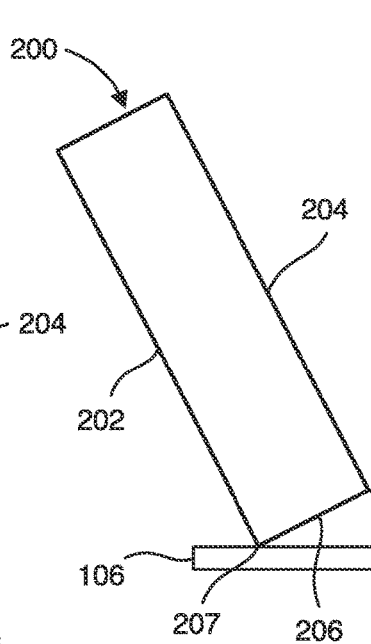 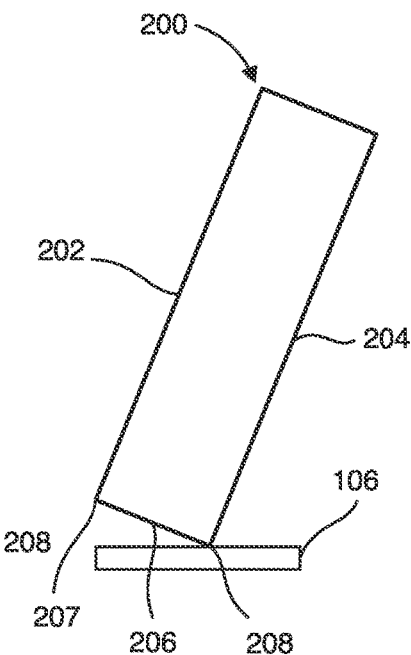
FIG. 2B  FIG. 2C  FIG. 2D

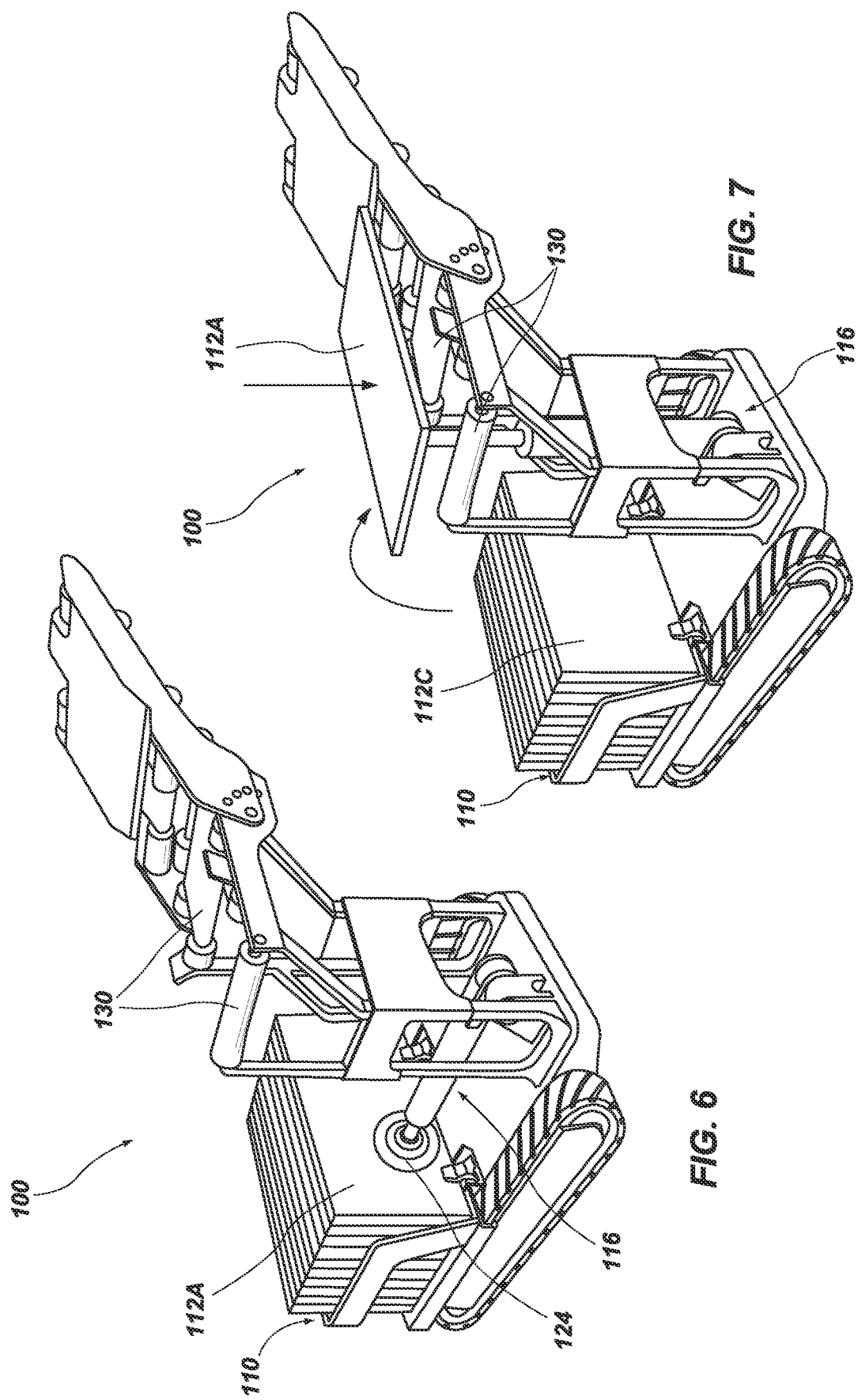

SOLAR PANEL DISPENSING DEVICE WITH VERTICAL SOLAR PANEL HOPPER LOADING AND DISPENSING

BACKGROUND

In recent years, electricity generation through the use of solar panels has become much more common and widespread. Solar panels and solar panel arrays are commonly installed on both commercial and residential buildings, as well as solar panel arrays located on racks or mounts in open fields and spaces. With solar panel arrays and solar panel installation becoming more common in society, quicker and more efficient ways of transporting solar panels to installation locations and dispensing solar panels for installation at the installation locations are needed to help increase installations rates, decrease transport time and costs, and generally facilitate more efficient and cost-effective installation of solar panels.

Efficiency for transporting and installing solar panels can be increased by transporting greater numbers of solar panels to installation locations with the solar panels being consolidated and transported in stacks containing multiple solar panels. However, transporting solar panels in a configuration in which the panels are stacked on top of each other can increase the risk of damage to lower solar panels in the stack that are supporting the weight of other solar panels stacked on top. Furthermore, removing solar panels from large stacks of solar panels can be cumbersome, difficult, and lead to damage to the solar panels as one or more panels are removed from the stack. For this reason, systems, devices, and methods for transporting, dispensing, and/or installing solar panels continue to be developed.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2A-2D illustrate various configurations and orientations of solar panels stored in the solar panel dispensing system of FIG. 1.

FIG. 6 illustrates the solar panel dispensing system of FIG. 1 with a solar panel end effector in an interfacing orientation and a solar panel in an upright orientation.

FIG. 7 illustrates the solar panel dispensing system of FIG. 1 with a solar panel end effector in a release orientation and a solar panel in a presentation orientation.

Figure 1:
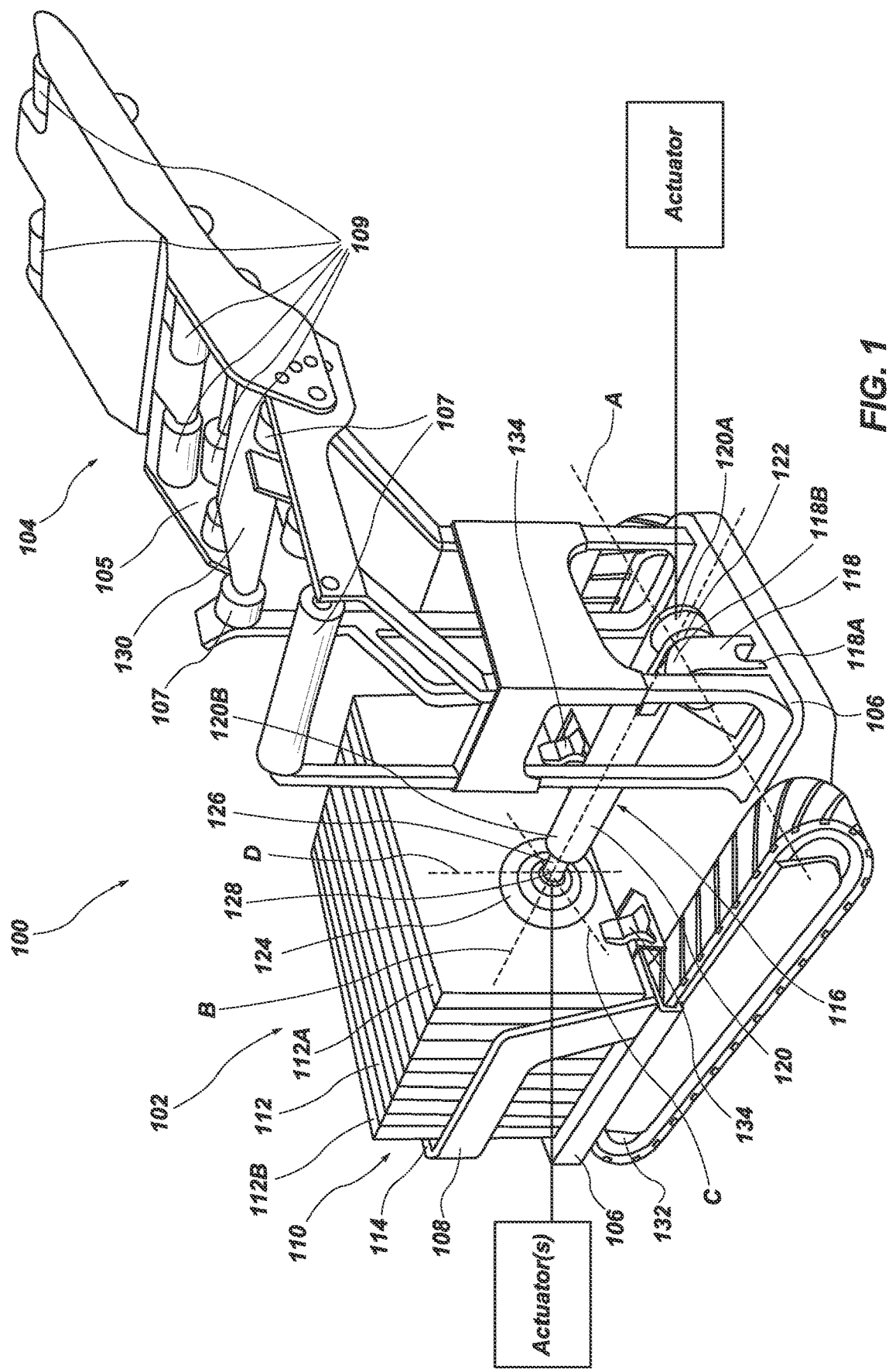
FIG. 1 illustrates a front isometric view of a solar panel dispensing system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In contexts where elements are recited to be "substantially aligned with" another element recited herein, it is intended that the recited element is still "substantially aligned with" another element when the element is either in perfect alignment with, or out of alignment by +/−10 degrees with the other element. In contexts where elements are recited to be "substantially parallel" to another element recited herein, it is intended that the recited element is still "substantially parallel" to the other element when the element is either perfectly parallel with, or is angled away from parallel with the other element by +/−10 degrees.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

As used herein, the singular forms "a," and, "the" include plural referents unless the context clearly dictates otherwise.

As used herein, the term "hopper" refers to a structure or component of a solar panel dispensing device/system that is shaped to house, hold, and/or contain a plurality of solar panels therein in an upright orientation, as defined below, and that facilitates the dispensing of the plurality of solar panels from the solar panel dispensing device/system.

As used herein, the term "upright orientation" refers to an orientation of one or more solar panels as they are stored in the hopper, and as they are oriented at a point in time immediately prior to and immediately after being acquired by an end effector of a robotic arm, but before being moved or manipulated by the end effector. In the upright orientation, the solar panel is supported on a side wall of the solar panel (side wall meaning any one of the outer surfaces of the solar panel (e.g., either a side or an end outer surface) with the solar panel in any orientation (e.g., either a portrait orientation or a landscape orientation) that intersects with a face surface of the solar panel, or is supported on an edge where the face surface and the side wall of the solar panel meet. In other words, the upright orientation is an orientation in which the solar panel is oriented in a hopper and supported on a base of the hopper in any way in which the solar panel is not supported on a face surface thereof. In the upright orientation, the one or more solar panels are positioned such that no solar panel is stacked on top of another solar panel, but rather, the one or more solar panels are supported in a side-by-side arrangement (e.g., see FIGS. 1-7). The "upright orientation" can comprise a solar panel oriented vertically relative to a ground or support surface, but this is not intended to be limiting in any way as "upright orientation" can also comprise a solar panel being oriented on an incline relative to the ground or support surface.

As used herein, the terms "supported on," "supported by," or saying that the one element "supports" and/or "is supporting" another element of the devices or systems described herein can refer to direct support indicating direct contact between the two elements, or this can refer to indirect support in which one or more intermediate elements are provided between the elements.

As used herein, the term "solar panel end effector" refers to any device, mechanism or system as part of a solar panel dispensing device/system. The end effector can be coupled to a robotic arm in some examples. The solar panel end effector can comprise a configuration that is operable to acquire, grip, grab, grasp, hold, lift, support, release, and/or otherwise manipulate (or any combination of these) a solar panel. As examples, the solar panel end effector can be a vacuum gripper, pneumatic gripper, hydraulic gripper, servo-electric gripper, adhesive gripper, magnetic gripper, electrostatic, or any type of end effector operable to acquire and release a solar panel.

As used herein, the term "actuator," refers to a component of a solar panel dispensing device/system that is operable to be actuated and moved in one or more linear and/or rotational degrees of freedom to cause movement of one or more other structures or components of the solar panel dispensing device/system, or a solar panel. Any actuator described herein can be a motor, can be electric, pneumatic, hydraulic, any other known actuator or motor for causing movement of one or more structure, or any combination of these. Example actuators of the solar panel dispensing device/system are described below, and shown in the drawings.

As used herein, the term "arm actuator," refers to a type of actuator of a solar panel dispensing device/system that is operable to move, in either a linear and/or rotational direction, one or more links, joints, structures, or elements of a robotic arm of the solar panel dispensing device/system.

As used herein, the term "rotational actuator," refers to a type of actuator of a solar panel dispensing device/system that is operable to move any structure, component, or element of the solar panel dispensing device/system in a rotational direction.

As used herein, the term "linear actuator," refers to a type of actuator of a solar panel dispensing device/system that is operable to move any structure, component, or element of the solar panel dispensing device/system in a linear direction.

As used herein, the term "interfacing orientation" refers to an orientation of the solar panel end effector immediately prior to and during acquiring of a solar panel contained in the hopper of the solar panel dispensing device/system.

As used herein, the term "release orientation" refers to an orientation of the solar panel end effector at a point in time in which the solar panel end effector releases the solar panel at a position where the solar panel is dispensed from the solar panel dispensing device or delivered to another component or structure of the solar panel dispensing device/system different than the solar panel end effector and the hopper.

As used herein, the term "presentation orientation" refers to an orientation of a solar panel as it is oriented immediately prior to and at release of the solar panel from the solar panel end effector, with the solar panel end effector being oriented in the release orientation.

As used herein, the term "solar panel support mechanism," refers to a mechanism of a solar panel dispensing device/system that is operable to retain one or more solar panels within the hopper in the upright orientation.

As used herein, the term "hopper projection member," refers to a structure or component of the solar panel support mechanism of the solar panel dispensing device/system that is operable to interface with a lead solar panel of the one or more solar panels to provide support for the lead solar panel and, optionally, one or more solar panels adjacent to the lead solar panel in the hopper.

As used herein, the term "hopper actuator," refers to the actuator of the solar panel support mechanism of the solar panel dispensing device/system that is operable to provide movement to the hopper projection member to facilitate supporting of the one or more solar panels contained in the hopper in the upright orientation.

As used herein, the term "hopper biasing system," refers to a system of the solar panel support mechanism of the solar panel dispensing device/system that is operable to provide a biasing force to bias the hopper projection member toward a support surface of the hopper to facilitate supporting of the one or more solar panels contained in the hopper in the upright orientation.

As used herein, the term "panel feed mechanism," refers to a mechanism of a solar panel dispensing device/system that is operable to move, bi-directionally, one or more solar panels contained in the hopper along an axis relative to the hopper.

As used herein, the term "solar panel interface member," refers to a structure or component of the panel feed mechanism of the solar panel dispensing device/system that is operable to interface with one or more solar panels contained in the hopper to provide a force to the one or more solar panels to feed the one or more solar panels along the axis relative to the hopper.

As used herein, the term "feed actuator," refers to an actuator of a solar panel dispensing device/system that is operable to provide movement to the solar panel interface member to facilitate feeding of the one or more solar panels along the axis relative to the hopper.

As used herein, the term "feed biasing system," refers to a system of the feed actuator of the solar panel support mechanism of the solar panel dispensing device/system that is operable to provide a biasing force to bias the solar panel interface member in a direction along the axis relative to the hopper.

As used herein, the term "support platform" refers to a structure or component of a solar panel dispensing device/system that is configured to receive and support a solar panel released from the solar panel end effector at the release orientation of the solar panel end effector and the presentation orientation of the solar panel.

As used herein, the term "guide arm" is intended to refer to a structure or component of a solar panel dispensing device/system that extends from the hopper, and that, either actively or passively, systematically guides solar panels to be dispensed at a desired position and orientation. The guide arm can be a static structure that merely acts as a pathway to guide the solar panels into position/orientation or it can be a system including actuatable or motorized elements configured to drive a solar panel to a desired position and orientation.

As used herein, the term "mobile platform" refers to a manned or unmanned vehicle operable to support and to facilitate controlled locomotion of a solar panel dispensing device/system around an environment.

As used herein, the term "flipper" refers to a structure or component moveable about a rotational degree of freedom, the flipper comprising a pivot point about which the flipper can be rotated from a first orientation to a second orientation.

As used herein, the term "storage orientation" refers to an orientation of the flipper in which the flipper is stored and the flipper is either aligned with the base of the hopper or extends away from the interior volume of the hopper.

As used herein, the term "spacer orientation" refers to an orientation of the flipper in which the flipper extends into the interior volume of the hopper.

An initial overview of the inventive concepts is provided below and then specific examples are described in further detail later. This initial summary is intended to aid readers in understanding the examples more quickly, but is not intended to identify key features.

Disclosed herein is a solar panel dispensing device. The solar panel dispensing device can include a base and a frame extending from the base. The frame and the base can together define a hopper having an interior volume. The hopper can be configured to contain one or more solar panels therein with the solar panels supported in an upright orientation. The solar panel dispensing device can further include a robotic arm moveable about the hopper in one or more degrees of freedom. The robotic arm can include a first end supported on the hopper and a second end distal to the first end. The robotic arm can further include a solar panel end effector supported on the second end. The solar panel end effector can be operable to acquire a lead solar panel of the one or more solar panels oriented in the upright orientation. The solar panel end effector can include an interfacing orientation and a release orientation. The robotic arm can further include an arm actuator operable to move the second end of the robotic arm and the solar panel end effector between the interfacing orientation and the release orientation. The interfacing orientation of the solar panel end effector can correspond to the lead solar panel being in the upright orientation, and the release orientation of the solar panel end effector can correspond to the lead solar panel being in a presentation orientation.

Also disclosed herein is a solar panel dispensing system. The solar panel dispensing system can include a solar panel dispensing device. The solar panel dispensing device can include a base and a frame extending from the base. The frame and the base can together define a hopper having an interior volume. The solar panel dispensing device can further include a robotic arm moveable about the hopper in one or more degrees of freedom. The robotic arm can include a first end supported on the hopper, the robotic arm being moveable in one or more degrees of freedom. The robotic arm can further include a solar panel end effector supported on a second end of the robotic arm that is distal to the first end. The solar panel end effector can include an interfacing orientation and a release orientation. The robotic arm can further include an arm actuator operable to move the second end of the robotic arm and the solar panel end effector between the interfacing orientation and the release orientation. The solar panel dispensing system can further include one or more solar panels contained in the hopper and supported in the hopper in an upright orientation. The solar panel end effector can be operable at the interfacing orientation to acquire a lead solar panel of the one or more solar panels supported in the hopper. The interfacing orientation of the solar panel end effector can correspond to the lead solar panel being in the upright orientation. The release orientation of the solar panel end effector can correspond to the lead solar panel being in a presentation orientation.

Also disclosed herein is a method of configuring a solar panel dispensing device. The method can include a step of configuring the solar panel dispensing device to comprise a base. The method can further include a step of configuring the solar panel dispensing device to comprise a frame extending from the base, the frame and base defining a hopper having an interior volume, the hopper being configured to contain one or more solar panels therein with the solar panels supported in an upright orientation. The method can further include a step of configuring the solar panel dispensing device to comprise a robotic arm moveable about the hopper in one or more degrees of freedom. The method can further include a step of configuring the robotic arm to comprise a first end supported on the hopper. The method can further include a step of configuring the robotic arm to comprise a second end distal to the first end. The method can further include a step of configuring the robotic arm to comprise a solar panel end effector supported on the second end, the solar panel end effector being operable to acquire a lead solar panel of the one or more solar panels oriented in the upright orientation, the solar panel end effector comprising an interfacing orientation and a release orientation. The method can further include a step of configuring the robotic arm to comprise an actuator operable to move the second end of the robotic arm and the solar panel end effector between the interfacing orientation and the release orientation. In the method, the interfacing orientation of the solar panel end effector can correspond to the lead solar panel being in the upright orientation, and the release orientation of the solar panel end effector can correspond to the lead solar panel being in a presentation orientation.

Also disclosed herein is a method of dispensing one or more solar panels from a solar panel dispensing device. The method can comprise a step of supporting one or more solar panels in an upright orientation within a hopper of the solar panel dispensing device, the hopper comprising a base and a frame extending from the base defining an interior volume. The method can further comprise a step of acquiring a lead solar panel of the one or more solar panels supported in the hopper with a solar panel end effector of a robotic arm, the solar panel end effector comprising an interfacing orientation, at which the solar panel end effector is operable to acquire the lead solar panel. The method can further comprise a step of actuating the robotic arm with an actuator to move the solar panel end effector from the interfacing orientation to a release orientation, at which the solar panel end effector is operable to release the lead solar panel. In the method, the interfacing orientation of the solar panel end effector can correspond to the lead solar panel being in the upright orientation, and the release orientation of the solar panel end effector can correspond to the lead solar panel being in a presentation orientation.

To further describe the present technology, examples are now provided with reference to the figures. FIG. 1 illustrates a front elevation view of a solar panel dispensing system 100 in accordance with an example of the present disclosure. As illustrated the solar panel dispensing system 100 can include a solar panel dispensing device 102 and, optionally, a solar panel installation device 104 operable with the solar panel dispensing device 102.

The solar panel dispensing device 102 can include a base 106. The solar panel dispensing device 102 can further include a frame 108 extending from the base 106. The frame 108 and the base 106 can together define a hopper 110 having an interior volume in which one or more solar panels 112 can be contained. A portion of the frame 108 of the hopper 110 can be a rear support 114 that acts as a back stop for the solar panels and supports the panels in the hopper 110. Specifically, the rear support 114 of the frame 108 can be positioned to support a rear solar panel (e.g., the rear solar panel 112B) of the one or more solar panels 112 in the upright orientation in the hopper 110. As shown in FIG. 1, the hopper 110 (e.g., including the frame 108, the base 106, and the rear support 114) is configured to contain and support the one or more solar panels 112 in the hopper 110 in an upright orientation where they are not stacked on top of one another, but stacked side by side one another.

The upright orientation of the solar panels 112 shown in FIG. 1 is a vertical orientation with respect to the base 106 and a ground surface on which the device 102 rests. However, it is to be understood, by the definition of "upright orientation" contained herein, that the upright orientation need not be strictly vertical but can deviate from vertical and still be in an upright orientation. The upright orientation of the solar panels 112 in the hopper 110 is illustrated with respect to FIGS. 2A-2D. In FIG. 2A, an example solar panel 200 is illustrated. As shown, the solar panel 200 can include a first face surface 202 and a second face surface 204 opposite to the first face surface 202. One or both of the first face surface 202 and the second face surface 204 can be the main solar-collecting surface(s) of the solar panel 200. The solar panel 200 can further include a side wall 206 extending from the first face surface 202 to the second face surface 204 and intersecting with the first face surface 202 and the second face surface 204. The side wall 206 can meet the first face surface 202 at a first edge 207 and the side wall 206 can meet the second face surface 204 at a second edge 208. The side wall 206 can extend around the entire perimeter of the solar panel 200. For example, in the case of a solar panel having a rectangular configuration, the sidewall 206 can comprise the two outer end surfaces, as well as the two outer side surfaces. The solar panel 200 can be considered to be positioned in an upright orientation when it is caused to rest and be supported on any of the side wall 206 surfaces, or any portion thereof (e.g., an edge of such surfaces).

FIGS. 2B-2D illustrate the solar panel 200 in various configurations relative to the base 106 that are each considered upright orientations under the meaning of that term defined in this disclosure. In FIG. 2B, the solar panel 200 is supported on the base 106 in an upright orientation in which the solar panel 200 interfaces with the base 106 at the side wall 206 of the solar panel 200. In FIG. 2B, it is further shown that the solar panel 200 is supported on the base 106 in an upright orientation wherein the solar panel 200 interfaces with the base 106 along the surface of the side wall 206 between each of the first and second edges 207 and 208 of the solar panel 200. In FIG. 2C, the solar panel 200 is supported on the base 106 in an upright orientation wherein the solar panel 200 interfaces with the base 106 at the first edge 207 of the solar panel 200 (e.g., the solar panel 200 is supported or resting on the first edge 207). In FIG. 2D, the solar panel 200 is supported on the base 106 in an upright orientation wherein the solar panel 200 interfaces with the base 106 at the second edge 208 of the solar panel 200 (e.g., the solar panel 200 is supported or resting on the second edge 208).

Based on FIGS. 2A-2D discussed above, the solar panel 200 can be supported on the base 106 in upright orientations in which the solar panel 200 interfaces with the base 106 at one or more of the side wall 206 (i.e., a vertical upright orientation), the first edge 207 (i.e., supported on an inclined upright orientation), and/or the second edge 208 (i.e., supported on an inclined upright orientation) of the solar panel 200. In the upright orientation, the first and/or second face surfaces 202 and 204 do not interface with the base 206.

It is to be further understood by this disclosure that the solar panel 200 can be supported by the base 106 by being in direct contact with the base 106, or the solar panel 200 can be supported by the base 106 by being in indirect contact with the base 106. For example, an intermediate element such as a rail system, support system, and/or mechanical or support structure (whether stationary or moveable) can be used between the base 106 and the solar panel 200 to support the solar panel 200.

With reference again to FIG. 1, the solar panel dispensing device 102 can include a robotic arm 116 that is moveable about the hopper 110 in one or more degrees of freedom. A first end of the robotic arm 116 can be supported on or by the hopper 110. As shown in FIG. 1, the robotic arm 116 can include a first link 118 at the first end of the robotic arm 116. The first link 118 can include a proximal end 118A. As shown in FIG. 1, the proximal end 118A is coupled to the hopper 110. However, it is to be understood that the proximal end 118A is not limited to being coupled to the hopper 110. For example, the proximal end 118A can be coupled to the base 106 of the hopper 110, coupled to the frame 108 of the hopper 110, or can be coupled to a separate structure (e.g., an arm mount) on the solar panel dispensing system 100. As one example, the base 106 can be the arm mount to which the proximal end 118A of the robotic arm 116.

Alternatively, the arm mount can be any other structure or part of the solar panel dispensing system capable of supporting the robotic arm 116 at a position to allow the robotic arm to interact with the hopper 110 and solar panels contained therein. The robotic arm 116 can further include a distal end 118B opposite to the proximal end 118A. The robotic arm 116 can include a second link 120 coupled to the first link 118. The second link 120 can include a proximal end 120A and a distal end 120B opposite to the proximal end 120A. The proximal end 120A of the second link 120 can be rotatably coupled to the distal end 118B of the first link 118 at a first joint 122, such that the second link 120 is rotatable about rotational axis A. The robotic arm 116 can further include an arm actuator (e.g., joint actuator 904 of FIGS. 9A and 9B) associated with the first joint 122. The arm actuator can be a rotational actuator operable to rotate the second link 120 relative to the first link 118. Rotation of the robotic arm 116 via the arm actuator associated with the first joint 122 will be described later with reference to other figures. It will be apparent to those skilled in the art that the robotic arm 116 can comprise many different configurations, including many different linkages, joints, and movement in one or more degrees of freedom. As such, the specific configuration shown in FIG. 1 is not intended to be limiting in any way.

A second end of the robotic arm 116, located distal to the first end, can support a solar panel end effector 124 thereon. The solar panel end effector can be an end effector of any configuration suitable to acquire, move, and/or manipulate a solar panel without any intended limitation. For example, the solar panel end effector 124 can be a vacuum gripper, a pneumatic gripper, a hydraulic gripper, a servo-electric gripper, an adhesive gripper, a mechanical gripper, a magnetic gripper, electrostatic, or any gripper suitable to acquire, hold, move, or otherwise manipulate a solar panel. Depending on the type of gripper, the solar panel end effector 124 can comprise a vacuum pump, hydraulic pump, pneumatic pump, servos, electronics, mechanisms, adhesives, magnets, or other such powered systems or materials sufficient to operate the solar panel end effector 124. The solar panel end effector 124 can be fixedly coupled to the distal end 120B of the second link 120 at a second joint 126. With the solar panel end effector 124 coupled to the robotic arm 116, the rotational arm actuator associated with the first joint 122 can be operable to rotate the second link 120 of the robotic arm 116 about the rotational axis A of the first joint 122 to move the solar panel end effector 124 (and an acquired solar panel) relative to the first link 118 and the hopper 110 (e.g., the base 106 and the frame 108). The solar panel end effector 124 can be directly coupled to the second link 120, either fixedly or slidably. Alternatively, the solar panel end effector 124 can be coupled to the second link 120, either fixedly or slidably, via at least one intervening link (i.e., a third link 128).

Although the robotic arm 116 is described above can include two or three links, it is to be understood that the robotic arm 116 can comprise any number of links, joints, and degrees of freedom, without limitation. The robotic arm can comprise a plurality of links, of any number, coupled together at a plurality of joints, of any number, extending from the first end of the robotic arm to the solar panel end effector. The number of links and joints is not intended to be limited by this disclosure.

With continued reference to FIG. 1, the solar panel dispensing device 102 can further include a support platform 130 positioned and configured to receive a solar panel from the robotic arm 116 and the solar panel end effector 124. The process of dispensing the solar panels 112 from the solar panel dispensing device 102 is described in further detail below with reference to FIGS. 3-5. The solar panel dispensing system 100 can further comprise a solar panel installation device 104 configured to receive solar panels from the support platform 130 and deliver or dispense the solar panels to installation locations where the solar panels are to be installed (e.g., into a solar panel mount where the solar panel is caused to be in an installed position ready for operation). The solar panel dispensing system 100 can further comprise a mobile platform 132 comprising wheels, rollers, treads, or any other systems and/or elements for causing locomotion of a platform. The mobile platform 132 can support the solar panel dispensing device 102 and facilitate movement and maneuverability of the solar panel dispensing device/system 102/100 about an environment.

The solar panel dispensing device 102 can further comprise one or more hopper projection member(s) 134 supported by at least one of the base 106 or the frame 108 of the hopper 110 and configured to interface with a lead solar panel (e.g., solar panel 112A) of the one or more solar panels 112 to hold the plurality of the solar panels in the upright position in the hopper 110.

Figure 3:
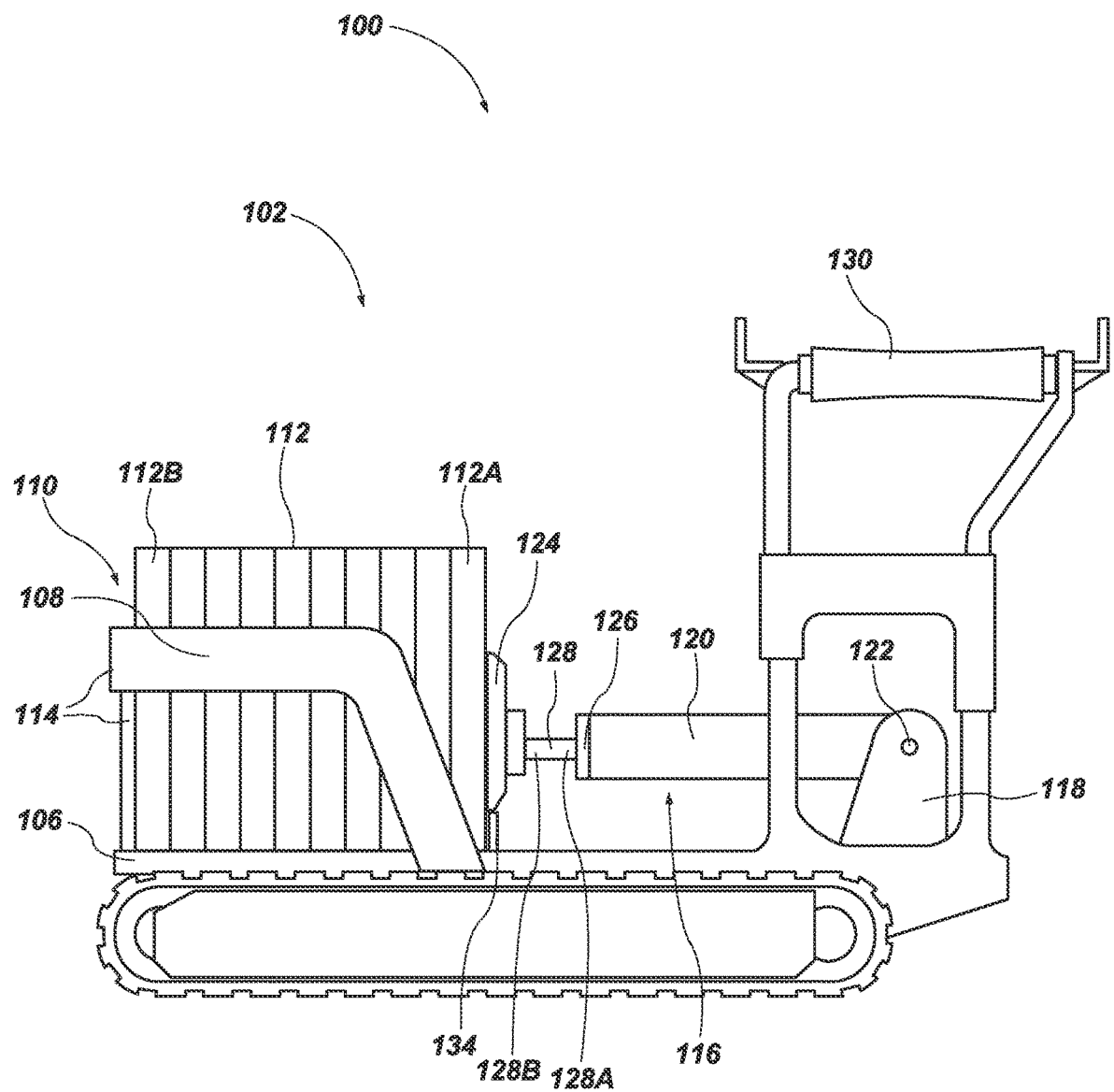
FIG. 3 illustrates an exemplary stage of operation of the solar panel dispensing system of FIG. 1.

The operation of the solar panel dispensing device 102 will be described with reference to FIGS. 1, and 3-5. Shown in FIG. 3 is a state of the solar panel dispensing device 102 in which the robotic arm 116 and solar panel end effector 124 are positioned to acquire a lead solar panel 112A from the plurality of solar panels 112 disposed in the hopper 110. The solar panel end effector 124 is operable to acquire the lead solar panel 112A, which is oriented in the upright orientation. As used herein, the term "acquire" refers to the solar panel end effector 124 grasping, gripping, suctioning to, or otherwise taking hold of a solar panel for the purpose of moving and manipulating the solar panel. The solar panels 112 of FIG. 3 are illustrated disposed in an upright orientation within the hopper 110. The solar panel end effector 124 is shown in FIG. 3 oriented in an interfacing orientation, which is an orientation of the solar panel end effector 124 immediately prior to and during acquiring of a solar panel contained in the hopper 110 of the solar panel dispensing device 102. The interfacing orientation of the solar panel end effector 124 is a suitable orientation in which the solar panel end effector 124 can acquire the lead solar panel 112A in the upright orientation. Therefore, in other words, the interfacing orientation of the solar panel end effector 124 corresponds to the upright orientation of the lead solar panel 112A.

Figure 4:
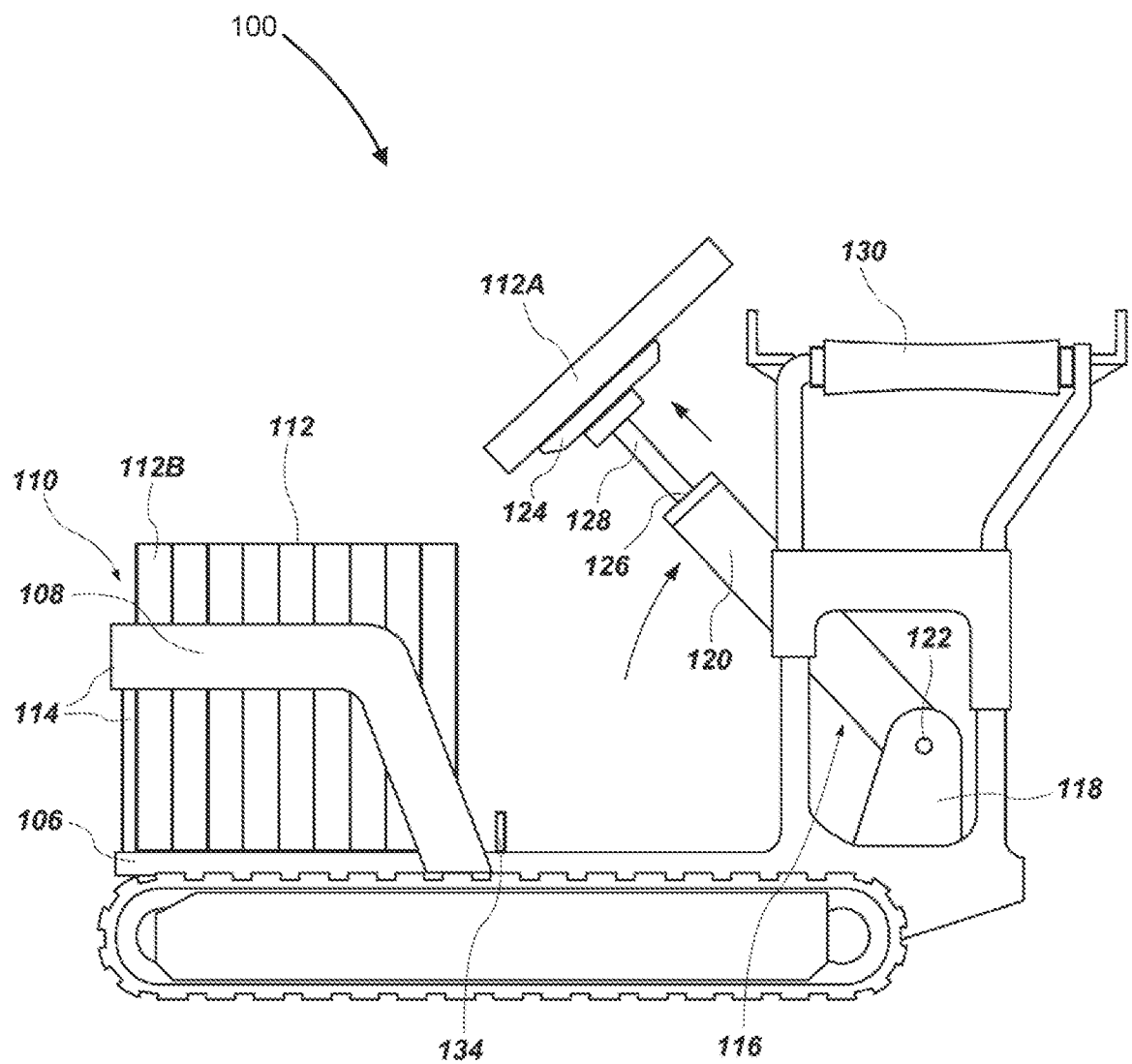
FIG. 4 illustrates an exemplary stage of operation of the solar panel dispensing system of FIG. 1.

Having acquired the lead solar panel 112A, the robotic arm 116 holding the lead solar panel 112A can be actuated by the arm actuator (e.g., actuator 904) associated with the first joint 122. The arm actuator is operable to move the second end (e.g., the solar panel end effector 124, the third link 128, and the second link 120) of the robotic arm 116 between the interfacing orientation and the release orientation. The third link 128 can comprise a proximal end 128A and a distal end 128B opposite to the proximal end 128A. In FIG. 4, the solar panel dispensing device system 100 is illustrated in a configuration in which the arm actuator has been operated to move the second link 120, the third link 128, and the solar panel end effector 124 relative to the first link 118 in a first rotational degree of freedom about the rotational axis A. The arm actuator associated with the first joint 122 can be a rotational actuator that is operable to rotate the second link 120 of the robotic arm 116 about the first joint 122 to move the solar panel end effector 124 between the interfacing orientation and the release orientation. In other words, the robotic arm 116 can rotate away from the base 106 of the hopper 110 and toward the support platform 130. The orientation of the solar panel end effector 124 illustrated in FIG. 4 is an intermediate orientation between the interfacing orientation and the release orientation. Similarly, the orientation of the lead solar panel 112A held by the solar panel end effector 124 is an intermediate orientation between the upright orientation and a presentation orientation of the solar panel that corresponds to the release orientation of the solar panel end effector 124.

Figure 5A:
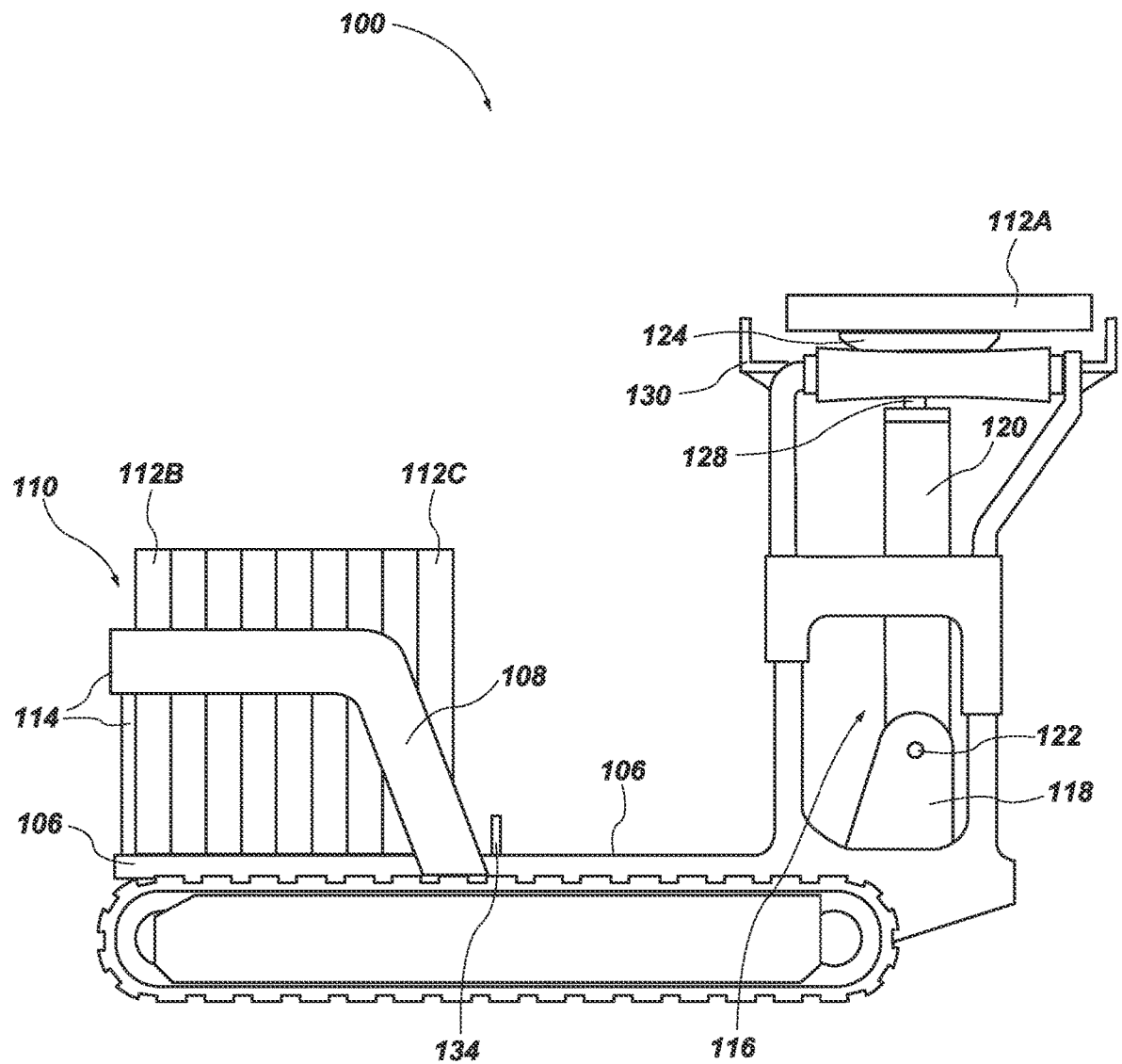
FIG. 5A illustrates an exemplary stage of operation of the solar panel dispensing system of FIG. 1.

FIG. 5A illustrates the solar panel dispensing device system 100 in a configuration in which the arm actuator associated with the first joint 122 has been operated to move the second link 120, the third link 128, and the solar panel end effector 124 relative to the first link 118 to a position where the solar panel 112A is adjacent to the support platform 130. The solar panel 112A is shown in the presentation orientation and the solar panel end effector 124 is in the release orientation. The release orientation refers to a position and an orientation of the solar panel end effector 124 in which the solar panel end effector 124 functions to facilitate the release of the solar panel, such as to facilitate the dispensing of the solar panel from the solar panel dispensing device, to facilitate the manual removal of the solar panel by one or more individuals, or to facilitate delivery of the solar panel to another component or structure of the solar panel dispensing device/system different than the solar panel end effector and the hopper. The presentation orientation refers to an orientation of an acquired solar panel 112A as it is oriented immediately prior to and during release of the solar panel 112A from the solar panel end effector 124 with the solar panel end effector 124 being oriented in the release orientation.

Indeed, in the position shown in FIG. 5A, the solar panel 112A can be presented to one or more individuals who can manually lift off the solar panel end effector 124 as it is released from the solar panel end effector 124. Alternatively, the solar panel 112A can be further manipulated so as to facilitate the release of the solar panel 112A onto the support platform 130 for later collection by one or more individuals. Alternatively, the solar panel 112A can be released to the support platform 130 and can then be fed by hand or via an automatic feed mechanism into the solar panel installation device 104 that then carries the solar panel to an installation location and/or installs the solar panel into a solar panel mount.

Upon the solar panel 112A being released from the solar panel end effector 124, the solar panel end effector 124 can be free to acquire another solar panel from the hopper 110. Therefore, with the solar panel 112A released and removed from the solar panel end effector 124, the robotic arm 116 can be actuated back to the position shown in FIG. 3. The solar panel end effector 124 can then acquire another solar panel (i.e., the new lead solar panel 112C shown in FIG. 5A). Subsequently, assuming the prior solar panel 112A is out of the way, the robotic arm 116 can then move the new lead solar panel 112C from the upright orientation (e.g., vertical orientation of panel 112A shown in FIG. 3) to the presentation orientation (e.g., horizontal orientation of panel 112A shown in FIG. 5A) by moving the solar panel end effector 124 from the interfacing orientation (e.g., the orientation shown in FIG. 3) to the release orientation (e.g., the orientation shown in FIG. 5A). Accordingly, the interfacing orientation of the solar panel end effector 124 corresponds to the lead solar panel 112A being in the upright orientation, and the release orientation of the solar panel end effector 124 corresponds to the lead solar panel 112A being in a presentation orientation. This process can be repeated as often as needed or desired.

Further functionality and actuation in a second or additional degree of freedom can be applied to the robotic arm 116 in addition to the rotational actuation and associated degree of freedom of the robotic arm 116 by the arm actuator associated with the first joint 122. In one example, the robotic arm 116 can be configured to linearly extend and retract (i.e., undergo linear actuation) along a longitudinal axis B to linearly extend and retract the solar panel end effector 124 (e.g., relative to the hopper 110). For example, as shown in FIG. 4, and not intending to be limiting in any way, the third link 128 can be slidably engaged with the second link 120 at the second joint 126. An actuator, such as a linear actuator or a rotary actuator and associated rotary to linear motion mechanism, can be associated with the second joint 126 to actuate the third link 128 relative to the second link 120 to cause the second link 120 to extend and retract, and to translate the solar panel end effector 124 along the axis B. In other words, the actuator (e.g., linear actuator) can be operable to translate the third link 128, and therefore the solar panel end effector 124 (and any acquired solar panel), relative to the second link 120 in a linear manner so as to facilitate acquisition and subsequent release of a solar panel from the hopper 110. Accordingly, in addition to actuation of the arm actuator associated with the first joint 122, the robotic arm 116 can further include the actuator (e.g., linear actuator) associated with the second joint 126 to actuate the third link 128, and solar panel end effector 124 coupled thereto, linearly to translate outward or inward relative to the second link 120.

Figure 5C:
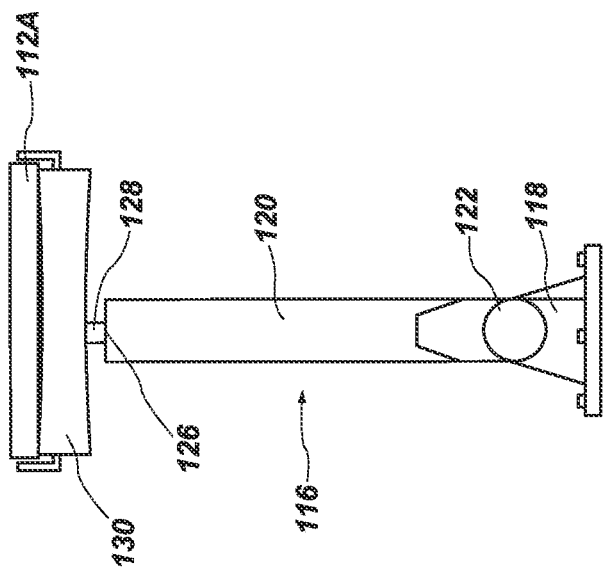
FIG. 5C illustrates an exemplary stage of operation of the solar panel dispensing system of FIG. 1.
Figure 5B:
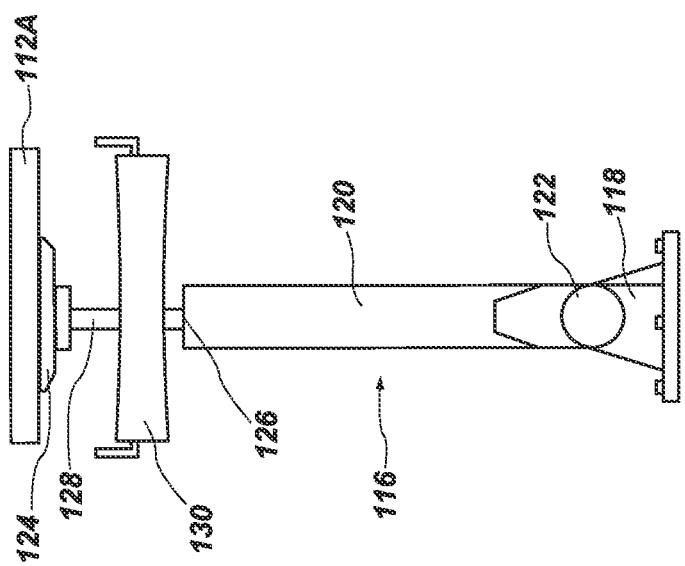
FIG. 5B illustrates an exemplary stage of operation of the solar panel dispensing system of FIG. 1.

As shown in FIG. 3, the linear actuation of the third link 128 and the solar panel end effector 124 relative to the second link 120 can facilitate the solar panel end effector 124 being able to extend relative to the second link 120 along the axis B to interface with and acquire the lead solar panel 112A from the hopper 110. Once the lead solar panel 112A is acquired, the solar panel end effector 124 can be retracted to at least partially separate the lead solar panel 112A from the other solar panels 112 in the hopper 110. The linear actuation of the solar panel end effector 124 can, additionally or alternatively, be carried out during rotation of the second link 120 about the first joint 122. For example, as shown in FIG. 4, the third link 128 and the solar panel end effector 124 can actuate linearly by extending or retracting relative to the second link 120 via second joint 126. The solar panel end effector 124 can be actuated linearly relative to the second link 120 in order to lift the lead solar panel 112A to a height sufficient to clear the support platform 130 as the robotic arm 116 rotationally actuates the solar panel end effector 124 to the release orientation and the lead solar panel 112A to the presentation orientation. In the orientation shown in FIG. 5B, the lead solar panel 112A can be held by the robotic arm 116 above the support platform 130. Then, as shown in FIG. 5C, the third link 128 and the solar panel end effector 124 can be retracted relative to the second link 120 by actuation of the actuator associated with the second joint 126 to set and release the lead solar panel 112A on the support platform 130.

In another example, the robotic arm 116 can still comprise additional degrees of freedom. More specifically, the solar panel end effector 124 can be moveably coupled to the third link 128, such that it is configured to rotate relative to the third link 128 in one or more degrees of freedom. In one example, the robotic arm can comprise a third joint that facilitates rotation of the solar panel end effector 124 about the longitudinal axis B (e.g., a roll degree of freedom). In another example, the robotic arm 116 can comprise a joint that facilitates rotation of the solar panel end effector 124 about an axis C (e.g., a pitch degree of freedom). In still another example, the robotic arm 116 can comprise a joint that facilitates rotation of the solar panel end effector 124 about an axis D (e.g., a yaw degree of freedom). In still another example, the robotic arm 116 can comprise any combination of or all of the above described joints to facilitate rotation of the solar panel end effector 124 relative to the third link 128 (or the second link 120) in one or more roll, pitch and/or yaw degrees of freedom about axes B, C and/or D.

In an alternative configuration, the third link 128 can further be rotatably coupled to the second link 120, such that the third link 128 rotates in at least one of a roll, pitch or yaw degree of freedom relative to the second link 120.

FIG. 6 illustrates an alternate view of the solar panel dispensing system 100 of FIG. 1 with the solar panel end effector 124 in an interfacing orientation and the lead solar panel 112A in an upright orientation within the hopper 110. FIG. 7 illustrates an alternate view of the solar panel dispensing system 100 of FIG. 1 with the solar panel end effector 124 in a release orientation and the lead solar panel 112A in a presentation orientation adjacent to the support platform 130, following actuation of the arm actuator associated with the first joint 122 to rotate the robotic arm 116.

Figure 8A:
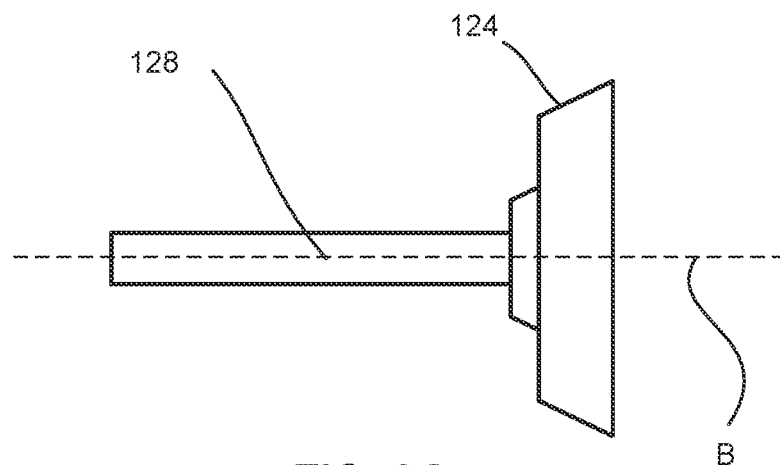
FIGS. 8A and 8D illustrate exemplary solar panel end effectors for use in the solar panel dispensing system of FIG. 1 in accordance with examples of the present disclosure.

FIGS. 8A-8D illustrate alternative configurations of the solar panel end effector and the third link 128. As shown in FIG. 8A, the solar panel end effector 124 can be rigidly coupled to the third link 128. In one example, the solar panel end effector 124 and the third link 128 can be integrally formed with each other. In the configuration of FIG. 8A, the solar panel end effector 124 comprises a separate component rigidly connected to the third link 128, such that no relative motion between the third link 128 and the solar panel end effector 124 is possible.

Figure 8B:
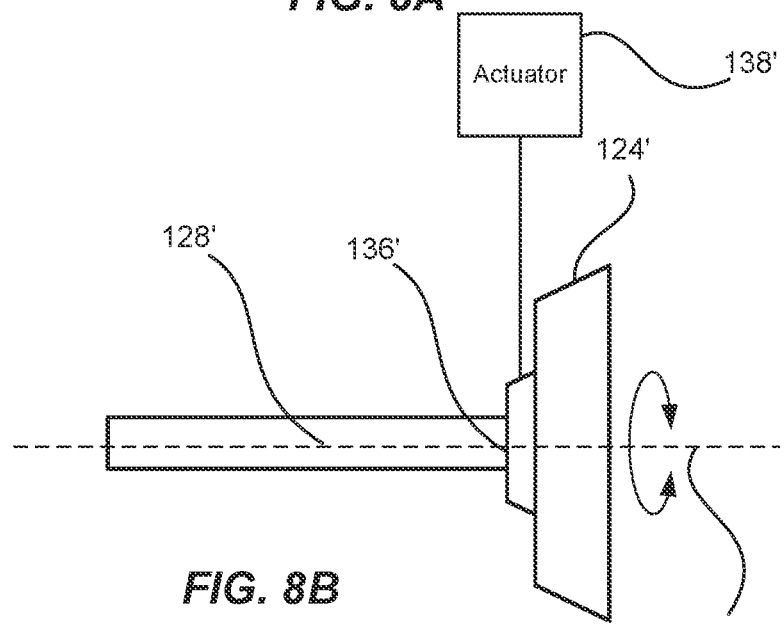

FIG. 8B illustrates another example where the solar panel end effector 124' can be moveably coupled to the third link 128' at a third joint 136 to allow rotation of the solar panel end effector 124' relative to the third link 128' about the axis B. This may be considered a rotational or roll degree of freedom with respect to the longitudinal axis B shown. The movement of the solar panel end effector 124' in this degree of freedom can be achieved via an actuator 138, such as a rotational actuator (e.g., motor). The third joint 136 can rotatably couple the solar panel end effector 124' to the distal end 128B' of the third link 128'. The proximal end 128A' of the third link 128' can interface with the second link 120 at the second joint 126 to provide translational motion between the third link 128' and the second link 120.

Figure 8C:
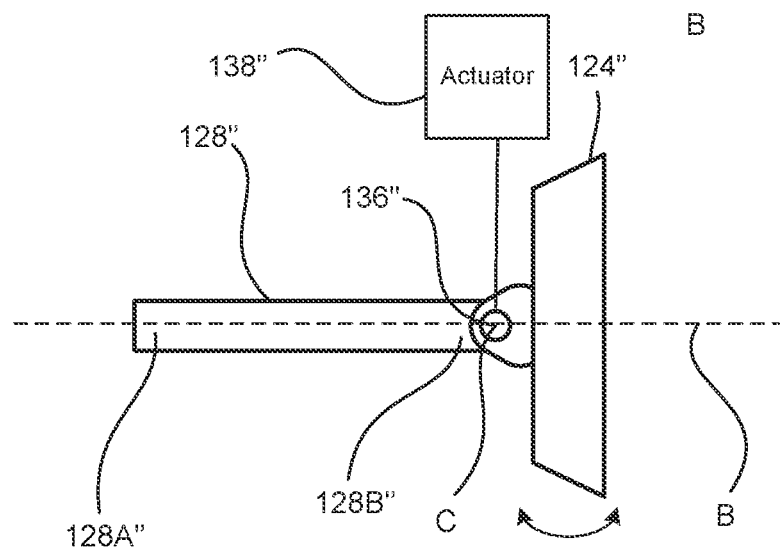

In still another example, as illustrated in FIG. 8C, the solar panel end effector 124" can be moveably coupled to the third link 128" at a fourth joint 136" to allow rotation of the solar panel end effector 124" relative to the third link 128" about the axis C (into the page in FIG. 8C). This may be considered a rotational or pitch type of degree of freedom with respect to the axis B shown. The movement of the solar panel end effector 124" in this degree of freedom can be achieved via an actuator 138", such as a rotational actuator (e.g., motor). The fourth joint 136" can rotatably couple the solar panel end effector 124" to the distal end 128B" of the third link 128". The proximal end 128A" of the third link 128" can interface with the second link 120 at the second joint 126 to provide translational motion between the third link 128" and the second link 120.

In still another example, the solar panel end effector 124''' can be moveably coupled to the third link 128''' at a fifth joint 136''' to allow rotation of the solar panel end effector 124''' relative to the third link 128''' about the axis D. This may be considered a rotational or yaw type of degree of freedom with respect to the axis B shown. The movement of the solar panel end effector 124''' in this degree of freedom can be achieved via an actuator 138''', such as a rotational actuator (e.g., motor). The fifth joint 136''' can rotatably couple the solar panel end effector 124''' to the distal end 128B''' of the third link 128'''. The proximal end 128A''' of the third link 128''' can interface with the second link 120 at the second joint 126 to provide translational motion between the third link 128" and the second link 120.

Figure 8D:
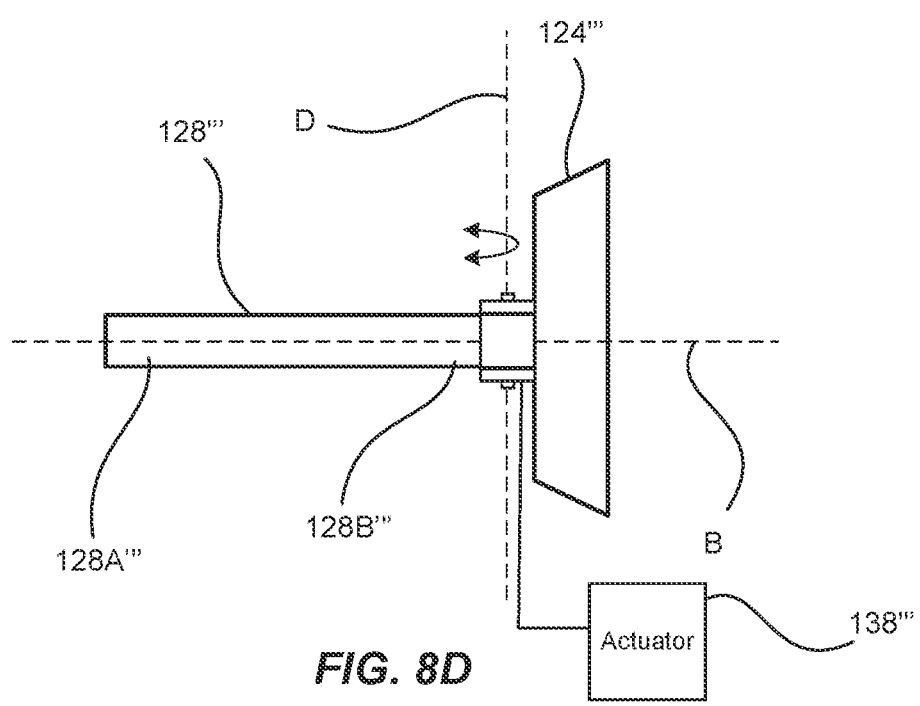

While the solar panel end effector 124-124''' are shown as being rotatable about in the various degrees of freedom about the various axes B, C, or D in FIGS. 8B-8D, respectively, it will be appreciated that in still another example, the coupling between the solar panel end effector and a link can be configured to facilitate movement of the solar panel end effector in a plurality of degrees of freedom. For example, a robotic arm is contemplated in which the robotic arm is configured to comprise any combination of (i.e., at least two of) the second, third, fourth or fifth joints discussed in FIGS. 8A-8D that facilitate movement of the solar panel end effector in any combination of (i.e., at least two of) the plurality of degrees of freedom about axes B, C, or D. Additionally, an end effector actuator can be associated with the third joint 136 and can be operable to move or rotate the solar panel end effector relative to the third link 128' about the third joint 136.

It is to be further understood that the solar panel end effector (e.g., any solar panel end effector described herein) can be any type of end effector suitable to acquire a solar panel, including but not limited to a vacuum gripper, pneumatic gripper, hydraulic gripper, servo-electric gripper, adhesive gripper, a mechanical gripper, a magnetic gripper, electrostatic, or any other end effector or gripper without any intended limitation. Although a vacuum type of gripper is illustrated, this is not intended to be limiting in any way.

Figure 9A:
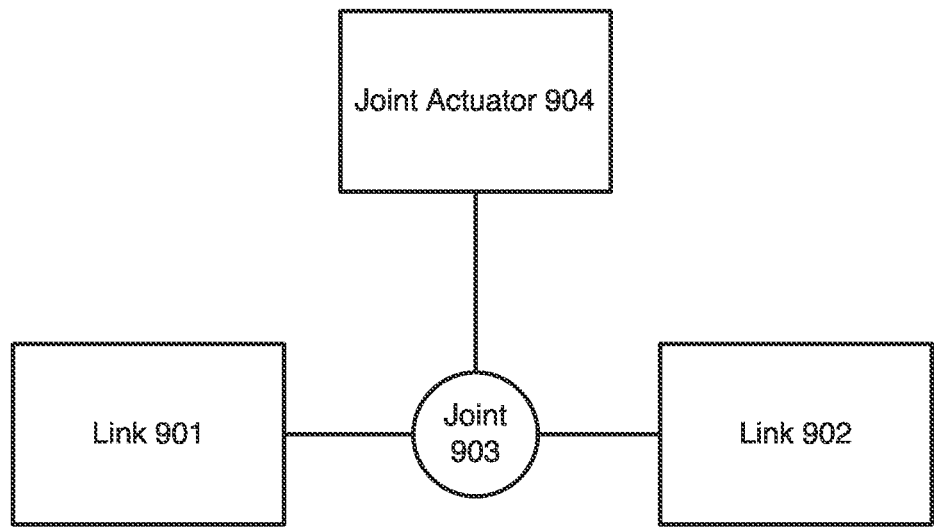
FIGS. 9A and 9B illustrate schematic diagrams of a joint in accordance with an example of the present disclosure.
Figure 9B:
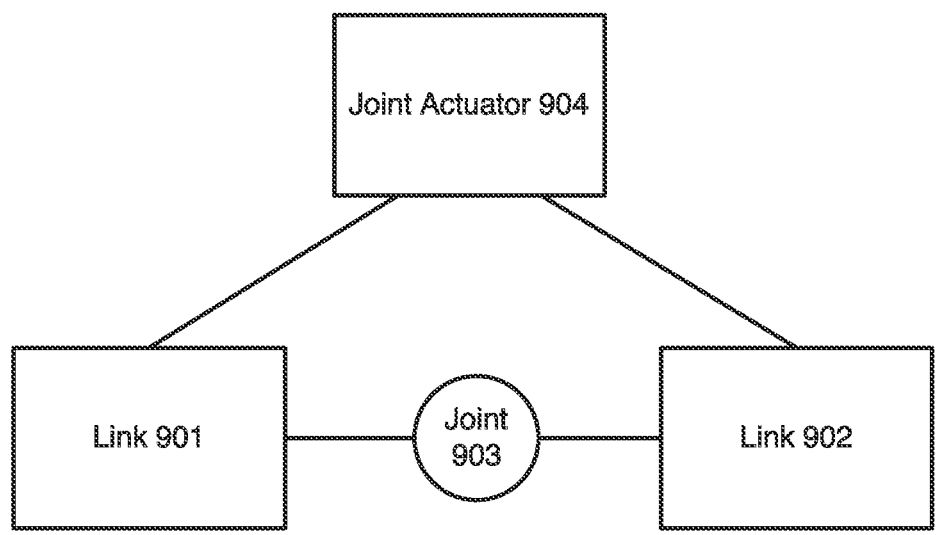

FIGS. 9A and 9B illustrate schematic diagrams of possible configurations of each joint described herein (e.g., first joint 122, second joint 126, third joint(s) 136-136'''). As shown, at each joint, two or more links 901 and 902 can be coupled together at a joint 903. It is to be understood that the joint 903 can comprise an intervening component separate from the links 901 and 902 that facilitates coupling the link 901 to the link 902. Alternatively, the joint 903 can comprise a coupling point at which the links 901 and 902 are coupled to each other without any intervening components. As shown in FIG. 9A, the joint 903 can include a joint actuator 904 operable to impart motion to the joint 903 itself to move the link 901 relative to the link 902. As shown in FIG. 9B, the joint actuator 904 can alternatively directly move one or more of the links 901 and 902 to impart motion to the link 901 relative to the link 902 about the joint 903. The joint actuator 904 can be, for example, a rotational actuator, a linear actuator, or any actuator used for providing movement to links coupled at a joint. The joint actuator can be a motor, pneumatic actuator, electrical actuator, hydraulic actuator, or use any other methodology operable as an actuator. The joint actuator 904 can represent any actuator described herein (e.g., arm actuator, linear actuator, or any other actuators described herein).

With reference to FIGS. 1-10B, the hopper 110 can be configured in multiple different ways to facilitate supporting solar panels 112 in the hopper 110 of the solar panel dispensing system 100. FIG. 10A illustrates a side view of an exemplary modification to the hopper 110 to facilitate storing and supporting solar panels 112 in the hopper 110. For example, the hopper 110 can include a plurality of spacer projection members 140 supported by and projecting upward from the base 106. The plurality of spacer projection members 140 can define one or more slots 142 each configured to receive at least one solar panel of the one or more solar panels 112 in the upright orientation. A slot 142 can be defined between the rear support 114 of the frame 108 and a spacer projection member 140 closest to the rear support 114. Subsequent slots 142 can be defined between each of the adjacent spacer projection members 140 supported on the base 106. The spacer projection members 144 can provide spacing between adjacent solar panels 112 stored in the slots 142 to avoid contact between adjacent solar panels 112 and to avoid damage to solar panels 112 as they are removed from the hopper 110 by the robotic arm 116.

Figure 10A:
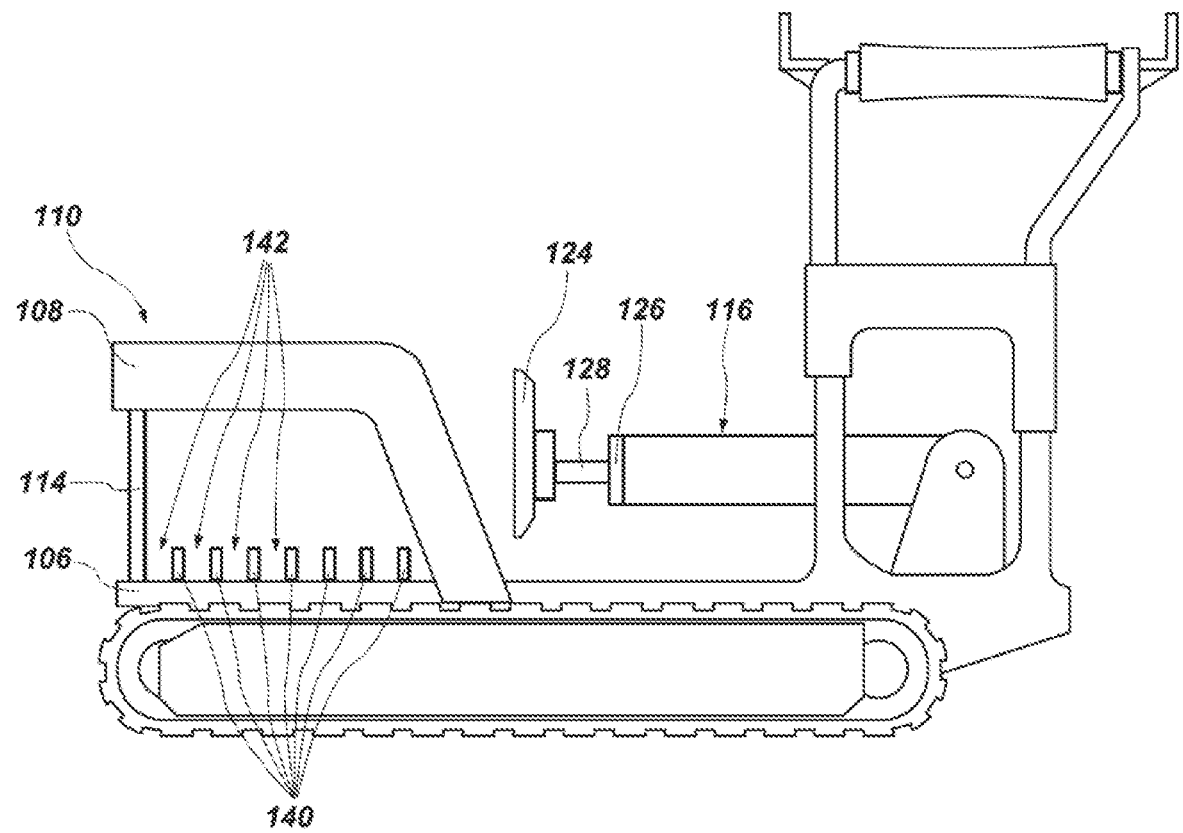
FIG. 10A illustrates a side view of a solar panel dispensing system in accordance with an example of the present disclosure.
Figure 10B:
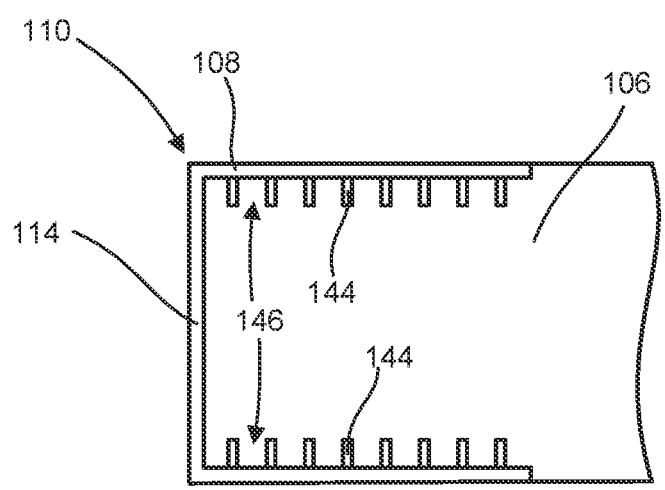
FIG. 10B illustrates a top view of a hopper of the solar panel dispensing system of FIG. 10A.

FIG. 10B illustrates another exemplary modification to the hopper 110 to facilitate storing and supporting solar panels in the hopper 110. FIG. 10B illustrates a top view of the hopper 110 of the solar panel dispensing system 100. In addition or alternative to the plurality of spacer projection members 140 projecting upward from the base 106, the hopper 110 can include a plurality of spacer projection members 144 supported by a sidewall and that project inward from an interior surface of the frame 108. The plurality of spacer projection members 144 can define one or more slots 146 each configured to receive at least one solar panel of the one or more solar panels 112. A slot 146 can be defined between the rear support 114 of the frame 108 and a spacer projection member 144 closest to the rear support 114. Subsequent slots 146 can be defined between each of the adjacent spacer projection members 144 supported on the frame 108. The spacer projection members 144 can provide spacing between adjacent solar panels stored in the slots 146 to avoid contact between adjacent solar panels and to avoid damage to solar panels as they are removed from the hopper 110 by the robotic arm 116.

In the configurations shown in FIGS. 10A and 10B, the solar panels loaded into the hopper each stay stationary in their respective slots 142. The robotic arm can be capable to acquire each of the solar panels in turn via the actuation of the robotic arm 116 in its one or more degrees of freedom (e.g., by linear translation of the third link 128 and the solar panel end effector 124, and/or the rotation of the solar panel end effector 124 in one or more degrees of freedom relative to the rest of the robotic arm 116). The translation of the third link 128 and the solar panel end effector 124 can be accomplished by operation of the linear actuator associated with the second joint 126. In other words, the solar panel end effector 124 can acquire a solar panel in a slot closest to the robotic arm 116. Despite other solar panels subsequent to the lead solar panel being farther from the robotic arm 116 and the solar panel end effector 124, the solar panel end effector 124 can be translated linearly deeper into the hopper 110 in order to retrieve the other solar panels stored in the hopper 110 behind a lead solar panel. The solar panel end effector 124 can be translated linearly to depths within the hopper 110 corresponding to each solar panel in each slot 142 in order to retrieve, in turn each of the solar panels in the hopper 110, including the rear most solar panel in a slot adjacent to the rear support 114. Likewise, the rotation of the solar panel end effector 124 can be accomplished by operation of the one or more actuators associated with the one or more third, fourth, or fifth joints discussed above. Translation and/or rotation of the solar panel end effector 124 in one or more degrees of freedom can facilitate more efficient acquisition of a lead solar panel, as well as release of an acquired solar panel.

The solar panel dispensing device can further include a solar panel support mechanism 148 configured to support and hold the solar panels in the hopper 110 in the upright position. The solar panel support mechanism 148 can comprise the hopper projection members 134 shown in FIG. 1. The hopper projection members 134 can be stationary on the base 106 of the hopper 110 and can operate as a front stop for the solar panels. The hopper projection members 134 can interface with a surface of the lead solar panel to hold the solar panels in the hopper 110 in the upright orientation and in a certain position within the hopper 110.

Figure 11A:
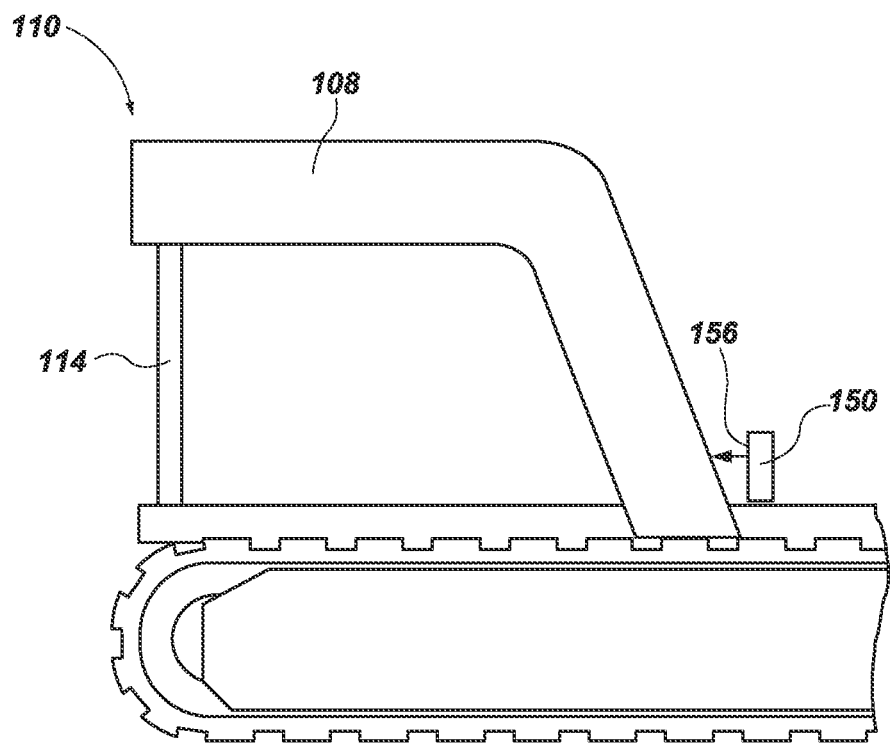
FIG. 11A illustrates a side view of a hopper of a solar panel dispensing system in accordance with an example of the present disclosure.
Figure 11B:
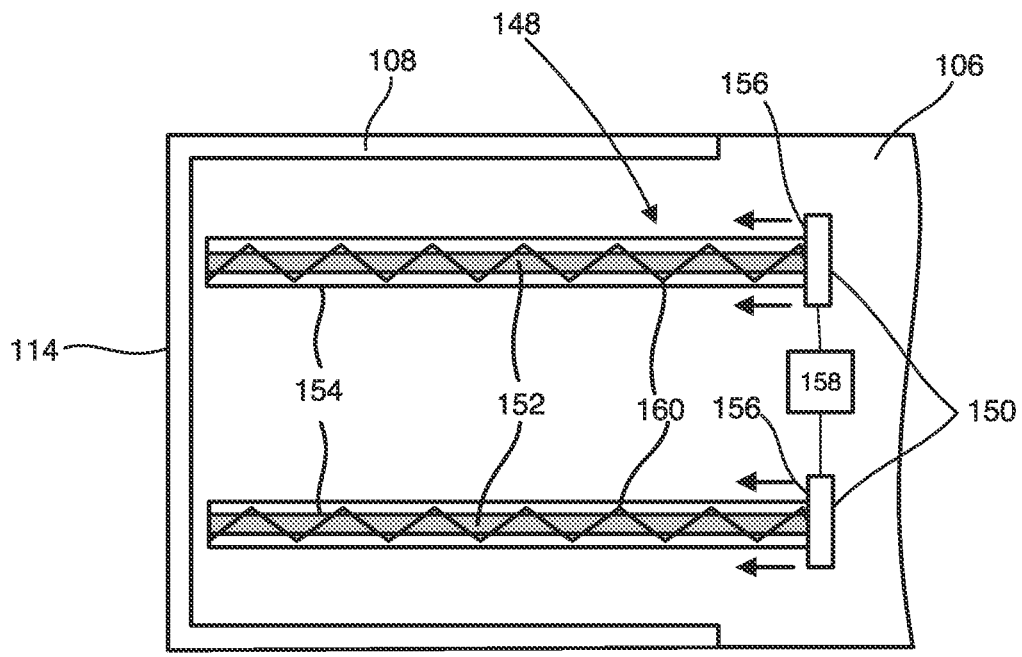
FIG. 11B illustrates a top view of the hopper of FIG. 11A.

Alternative example configurations of the solar panel support mechanism 148 of the solar panel dispensing system 100 are contemplated. For example, in the solar panel support mechanism 148 of FIGS. 11A and 11B, the hopper projection members 150 can be moveably supported by at least one of the base 106 or the frame 108 of the hopper 110. As illustrated in FIGS. 11A and 11B, and with reference to FIGS. 1-11B, the hopper 110 can further comprise one or more moveable hopper projection members 150 moveably coupled to the base 106 and/or the frame 108 of the hopper 110. For example, as shown in FIGS. 11A and 11B, the moveable hopper projection members 150 can be moveably coupled to the base 106. The moveable hopper projection members 150 can be coupled to the base 106 via one or more tracks 152 disposed in one or more recesses 154 formed in the base 106. The moveable hopper projection members 150 can include an interface surface 156 configured to interface with the lead solar panel of the one or more solar panels in the hopper 110. The moveable hopper projection members 150 can be operated to move backward toward the rear support 114 of the frame 108 to press the solar panels in the hopper 110 against the rear support 114 and to provide frontward support to the panels to hold the panels in the upright orientation in the hopper 110. Accordingly, as lead solar panels are successively removed from the hopper 110, the moveable hopper projection members 150 can move backward toward the rear support 114 to cause the interface surface 156 to contact and interface with a next lead solar panel in the hopper 110. Thereby the solar panel support mechanism 148 can continue to provide support to retain the solar panels in the upright orientation in the hopper 110 as solar panels are successively removed from the hopper 110.

The moveable hopper projection members 150 can be operated to move toward the rear support 114 by various different mechanisms. For example, as illustrated schematically in FIG. 11B, a hopper actuator 158 can be operably coupled to the moveable hopper projection members 150 or the tracks 152. The hopper actuator 158 can be operable to move the moveable hopper projection members 150 on the tracks 152 toward the rear support 114. For example, the tracks 152 can be threaded rods threadably engaged with the moveable hopper projection members 150 and the hopper actuator 158 can operate to rotate the tracks 152 to drive the moveable hopper projection members 150 toward the rear support 114.

Additionally or alternatively, the hopper actuator 158 can include a hopper biasing system that biases the moveable hopper projection members 150 toward the rear support 114. For example, the hopper biasing system can include one or more biasing members 160 coupled to the moveable hopper projection members 150 that provide a biasing force to bias the moveable hopper projection members 150 toward the rear support 114. It should be understood that the biasing or driving of the moveable hopper projection members 150 toward the rear support 114 can be accomplished by any means without any intended limitation. For example, the biasing member can be magnetic, spring-based, pneumatic, hydraulic, or any a configuration of any known mechanism for biasing a member in a certain direction. The hopper actuator 158 can be any motor-driven, hydraulic, pneumatic, magnetic, passive spring, or any other mechanical mechanism used to drive a member in a direction. Furthermore, the configuration of the tracks is not intended to be limited in any way and can be any mechanism operable to moveably support a member and constrain the member to move in one or more particular directions.

In the configuration of the solar panel dispensing system including the solar panel support mechanism 148, the solar panels are driven or biased backward in the hopper 110 toward the rear support 114 of the frame 108. Accordingly, the solar panels in the hopper 110 are biased away from the robotic arm 116 and the solar panel end effector 124. To facilitate acquisition of the solar panels by the solar panel end effector 124, the robotic arm 116 can be suitably configured with one or more joints and associated degrees of freedom operable to acquire each of the solar panels in turn, such as by linear translation of the third link 128 and the solar panel end effector 124 relative to the rest of the robotic arm 116. The translation of the third link 128 and the solar panel end effector 124 can be accomplished by operation of the linear actuator associated with the second joint 126. In other words, the solar panel end effector 124 can acquire a lead solar panel closest to the robotic arm 116. Despite other solar panels subsequent to the lead solar panel being farther from the robotic arm 116 and the solar panel end effector 124 than the lead solar panel, the solar panel end effector 124 can be translated linearly deeper into the hopper 110 in order to retrieve the other solar panels stored in the hopper 110 behind a lead solar panel. The solar panel end effector 124 can be translated linearly to depths within the hopper 110 corresponding to each solar panel in the hopper 110 in order to retrieve, in turn each of the solar panels in the hopper 110, including the rear most solar panel in a slot adjacent to the rear support 114. Again, rotation of the solar panel end effector via one or more joints and associated degrees of freedom can also be used in conjunction with the linear actuation of the robotic arm 116 to acquire and release the solar panels in the hopper 110.

Described above are configurations of the solar panel dispensing system 100 in which the solar panels are contained in the hopper 110, such that the solar panels remain substantially stationary until they are acquired by the robotic arm 116. With the panels being substantially stationary in the hopper 110, the solar panel end effector 124 can be actuated linearly, rotationally in one or more degrees of freedom, or some combination of these, on the robotic arm 116, such that the solar panel end effector 124 is caused to be positioned in a position and orientation where it can facilitate acquisition of each of the solar panels for subsequent dispensing.

Figure 12A:
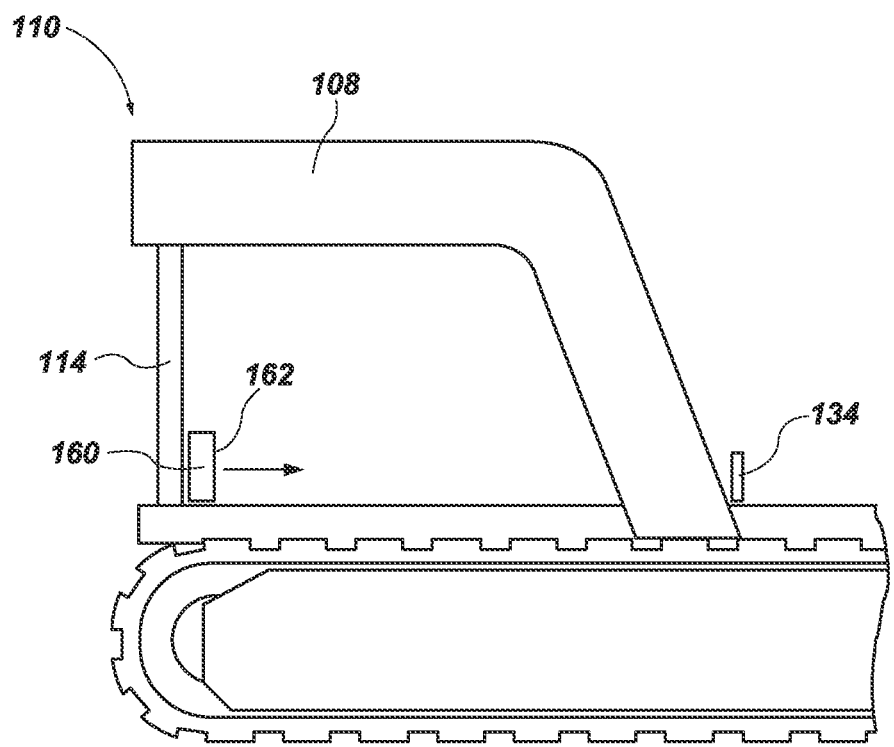
FIG. 12A illustrates a side view of a hopper of a solar panel dispensing system in accordance with an example of the present disclosure.
Figure 12B:
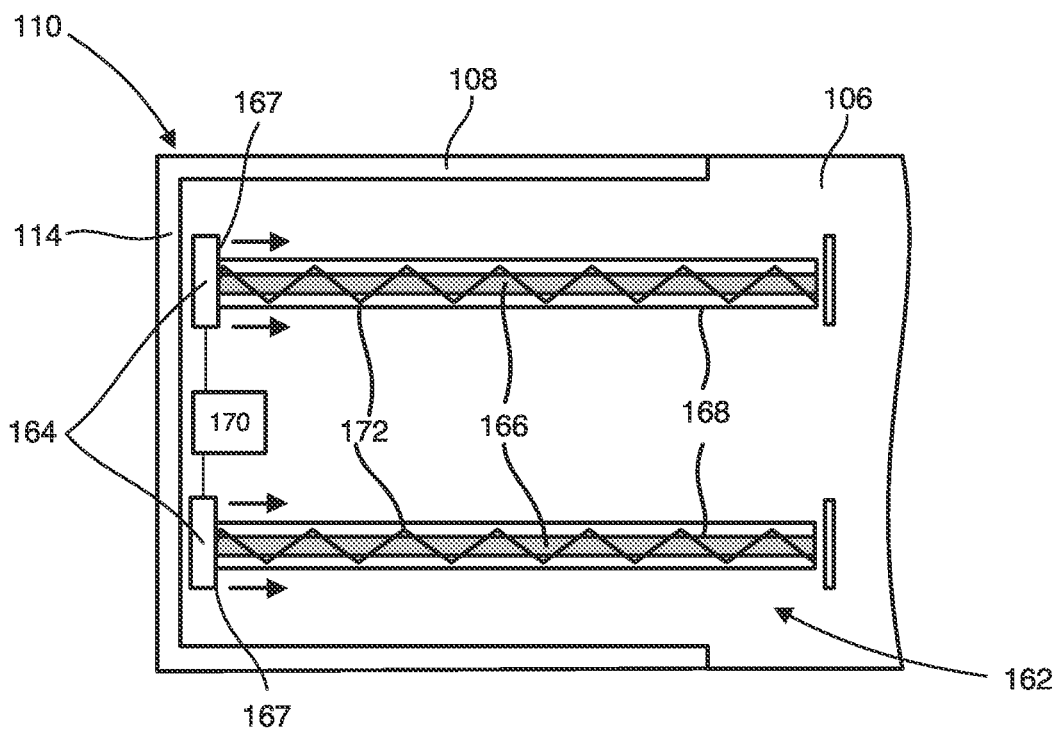
FIG. 12B illustrates a top view of the hopper of FIG. 12A.

Alternative configurations of the solar panel dispensing system 100 also exist in which the solar panels can be fed forward in the hopper 110 by a panel feed mechanism in order to drive the solar panels toward the solar panel end effector 124 of the robotic arm 116 rather than actuating the solar panel end effector 124 toward the solar panels. In at least one example, the hopper 110 can include a panel feed mechanism 162. The panel feed mechanism 162 can include one or more solar panel interface members 164 moveably coupled to the hopper 110. For example, as shown in FIGS. 12A and 12B, and with reference to FIGS. 1-12B, the solar panel interface members 164 can be moveably coupled to the base 106. The solar panel interface members 164 can be coupled to the base 106 via one or more tracks 166 disposed in one or more recesses 168 formed in the base 106. The solar panel interface members 164 can include an interface surface 167 configured to interface with a rear solar panel that is farthest from the robotic arm of the one or more solar panels in the hopper 110. The solar panel interface members 164 can be operated to move forward away from the rear support 114 of the frame 108 and toward the solar panel end effector 124 and/or the stationary hopper projection member(s) 134 to feed the solar panels in the hopper 110 toward the solar panel end effector 124 while being oriented in the upright orientation. Accordingly, as solar panels are successively removed from the hopper 110, the solar panel interface members 164 can move toward the solar panel end effector 124 and/or the stationary hopper projection member(s) 134.

The solar panel interface members 164 can be operated to move toward the solar panel end effector 124 and/or the stationary hopper projection member(s) 134 by various different mechanisms. For example, as illustrated schematically in FIG. 12B, and with reference to FIGS. 1-12B, a feed actuator 170 can be coupled to the solar panel interface members 164 or the tracks 166. The feed actuator 170 can be operable to move the solar panel interface members 164 on the tracks 166 toward the solar panel end effector 124 and/or the stationary hopper projection member(s) 134. For example, the tracks 166 can be threaded rods threadably engaged with the solar panel interface members 164 and the feed actuator 170 can operate to rotate the tracks 166 to drive the solar panel interface members 164 toward the solar panel end effector 124 and/or the stationary hopper projection member(s) 134. Additionally or alternatively, the hopper actuator can include a feed biasing system that biases the solar panel interface members 164 toward the solar panel end effector 124 and/or the stationary hopper projection member(s) 134. For example, the feed biasing system can include one or more biasing members 172 coupled to the solar panel interface members 164 that provide a biasing force to bias the solar panel interface members 164 toward solar panel end effector 124 and/or the stationary hopper projection member(s) 134. It should be understood that the biasing or driving of the solar panel interface members 164 toward the solar panel end effector 124 and/or the stationary hopper projection member(s) 134 can be accomplished by any means without any intended limitation. For example, the biasing member can be magnetic, spring-based, pneumatic, hydraulic, passive spring, or any known mechanism for biasing a member in a direction. The feed actuator 170 can be any motor-driven, hydraulic, pneumatic, magnetic, or any other mechanical mechanism used to drive a member in a direction. Furthermore, the configuration of the tracks is not intended to be limited in any way and can be any mechanism operable to moveably support a member and constrain the member to move in one or more particular directions.

Figure 13:
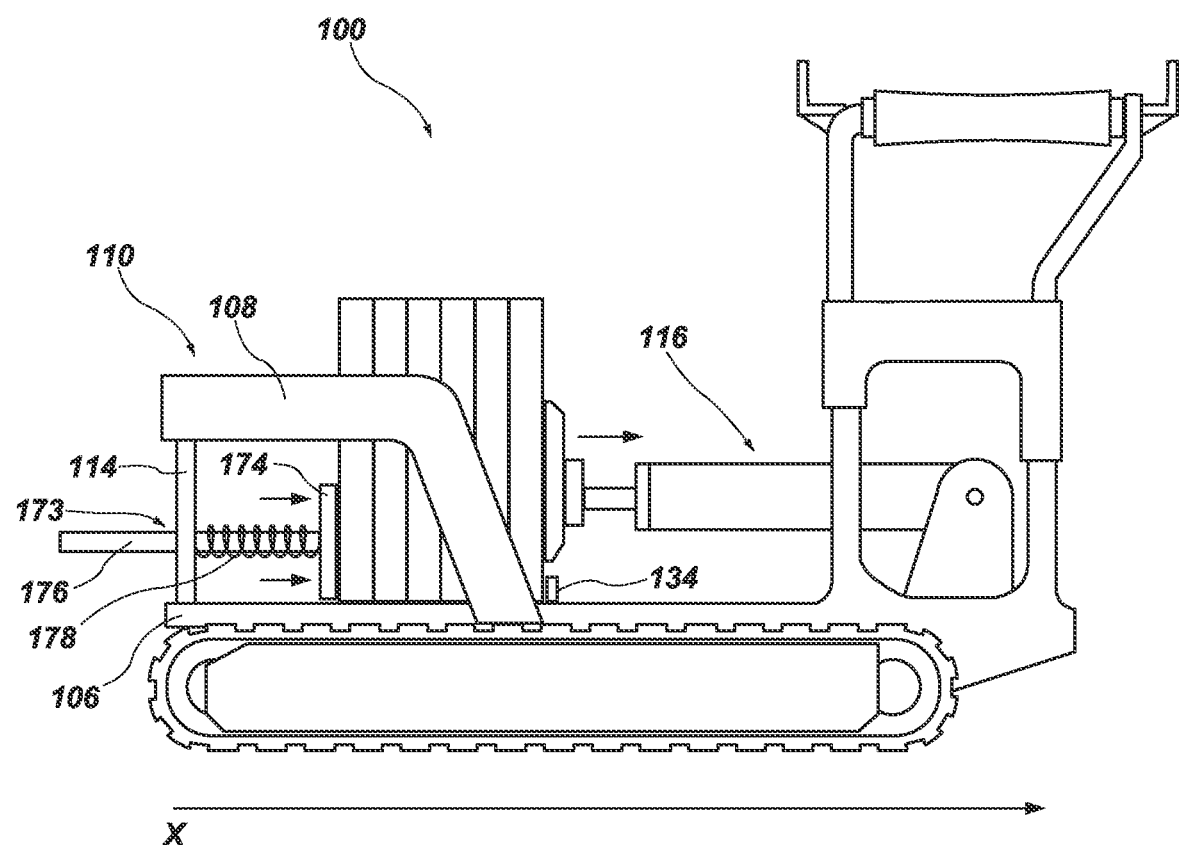
FIG. 13 illustrates a side view of a solar panel dispensing system in accordance with an example of the present disclosure.

Another alternative configuration of a panel feed mechanism 173 of the solar panel dispensing system 100 is shown in FIG. 13. With reference to FIGS. 1-13, as shown the panel feed mechanism can comprise a solar panel interface member 174 coupled to a plunger 176 that is moveably coupled to the frame 108 of the hopper 110 (e.g., the rear support 114 of the frame 108). The plunger can comprise a feed actuator 178 operable to bi-directionally move the solar panel interface member 174 along an axis (e.g., X axis shown in FIG. 13) relative to the hopper 110. The feed actuator 178 can comprise a spring or other biasing member that provides a biasing force to bias the plunger 176 and the panel interface member 174 toward hopper projection member 134 and robotic arm 116. Accordingly, the panel feed mechanism 173 can bias the solar panels in the hopper 110 toward the robotic arm 116 to facilitate acquiring and dispensing of solar panels by the robotic arm 116.

Figure 14:
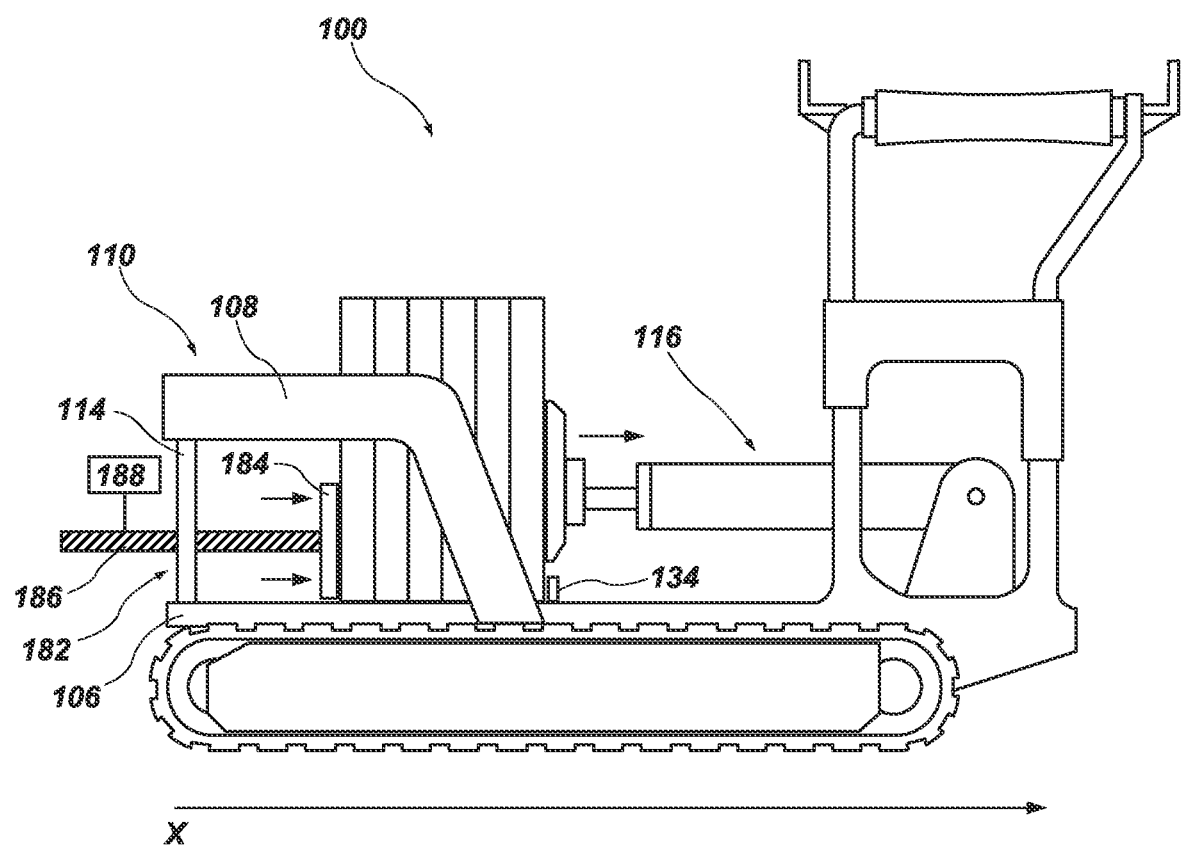
FIG. 14 illustrates a side view of a solar panel dispensing system in accordance with an example of the present disclosure.

Another alternative configuration of a panel feed mechanism 182 of the solar panel dispensing system 100 is shown in FIG. 14. With reference to FIGS. 1-14, as shown, the panel feed mechanism 182 can comprise a solar panel interface member 184 coupled to a threaded rod 186 that is threadably engaged with the frame 108 of the hopper 110 (e.g., the rear support 114 of the frame 108) and coupled to the solar panel interface member 184. The panel feed mechanism 182 can comprise a feed actuator 188 operable to bi-directionally move the solar panel interface member 184 along an axis in the direction X relative to the hopper 110. The feed actuator 188 can rotate the threaded rod 186. The feed actuator 188 can include a motor operable to rotate the threaded rod 186 to extend or retract the threaded rod 186 and solar panel interface member 184 within the hopper 110 to advance solar panels toward the robotic arm 116. Alternatively, the threaded rod 186 can include a handle to manually rotate the threaded rod 186 to bi-directionally move the solar panel interface member 174 along the axis relative to the hopper 110.

The feed actuators 178 and 188 can alternatively be a motor, hydraulic system, pneumatic system, electro-mechanical system, or any other system for bi-directionally moving the plunger 176 or threaded rod 186 along an axis in the direction of X relative to the hopper 110. No limitation on systems for driving the plunger 176 or threaded rod 186 forward is intended by this disclosure.

Figure 15:
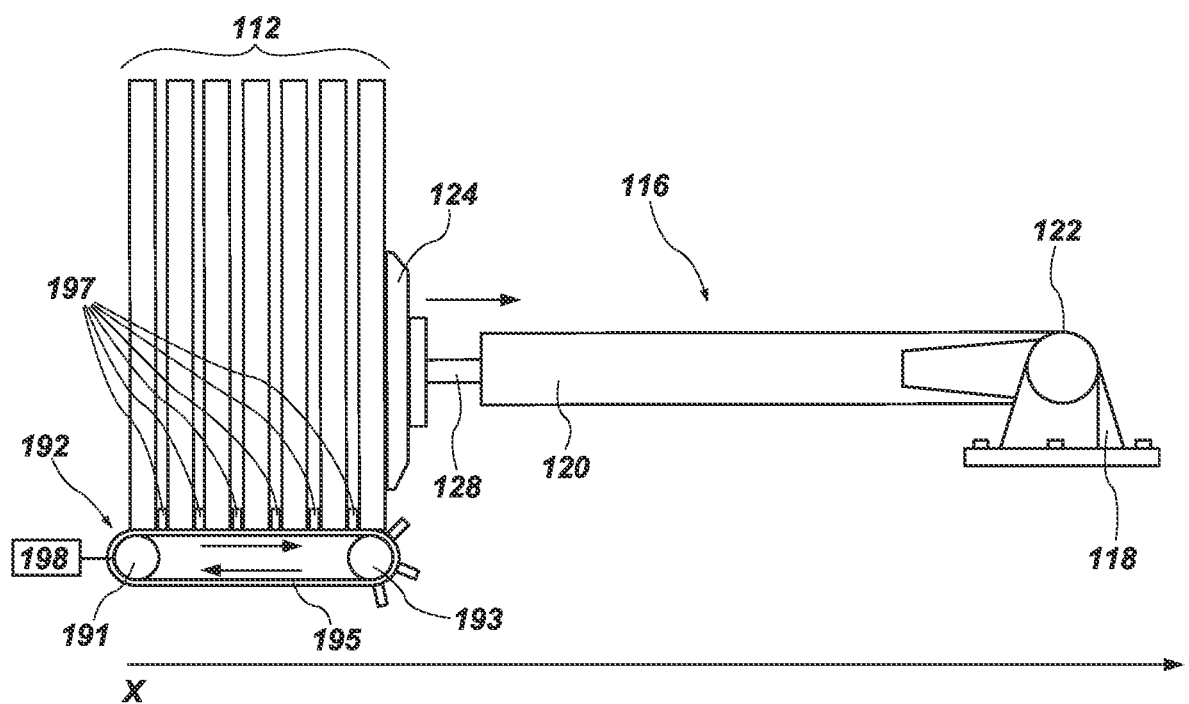
FIG. 15 illustrates a side view of a panel feed mechanism of a solar panel dispensing system in accordance with an example of the present disclosure.

Another alternative configuration of a panel feed mechanism 192 of the solar panel dispensing system 100 is shown in FIG. 15. With reference to FIGS. 1-15, as shown the panel feed mechanism 192 can comprise a plurality of rollers 191 and 193 and a feed actuator 198 that is operable to drive one or more of the plurality of rollers 191 and 193. The panel feed mechanism 192 can include a belt 195 stretched in tension over one or more of the rollers 191 and 193. The feed actuator 198 can be a motor that is operable to drive one or more of the rollers 191 and 193 to drive a portion of the belt 195 along an axis in the direction of X relative to the hopper. The hopper 110 is omitted in FIG. 15 in order to show the details of the panel feed mechanism 192. However, it is to be understood that the panel feed mechanism 192 can be installed in a recess in the base 106 of the hopper 110 in order to actuate the panels in the hopper along an axis in the direction of X relative to the hopper 110, similar to as shown in FIGS. 11A-14. The belt can contact the one or more solar panels 112 and can provide friction force to the panels in order to feed the solar panels 112 toward the robotic arm 116.

The belt 195 can include at least one feeder projection member 197 extending outward from a surface of the belt 195. The at least one feeder projection member 197 can be configured to drive a solar panel of the plurality of solar panels 112 along the axis in the direction of X relative to the hopper 110 during operation of the panel feed mechanism 192. As further shown in FIG. 15, the belt 195 can further include a plurality of feeder projection members 197 extending outward from a surface of the belt 195 that act as spacer projections to space out the solar panels 112. The plurality of feeder projection members 197 can be spaced about the surface of the belt 195 at distances to accommodate a solar panel of the one or more solar panels 112 between adjacent feeder projection members 197. According, by driving the belt 195 on the rollers 191 and 193, the panel feed mechanism 192 can be operable to feed the solar panels 112 toward the robotic arm 116 to facilitate acquiring and dispensing of solar panels 112 by the robotic arm 116. Of course, it is contemplated that the belt 195 can be driven in the opposite direction to drive the solar panels 112 towards the rear of the hopper 110.

In the configurations of the solar panel dispensing system including panel feed mechanisms (e.g., shown in FIGS. 12A-15), the solar panels 112 are driven or biased forward in the hopper 110 toward the hopper projection member 134 and/or toward of the solar panel end effector 124 of the robotic arm 116. To facilitate acquisition of the solar panels by the solar panel end effector 124, the robotic arm 116 can be capable to acquire each of the solar panels in turn by the solar panel end effector 124. With the solar panels 112 being fed toward the robotic arm, the third link 128 and the solar panel end effector 124 need not be moveable or linearly actuated for the solar panels 112 to interface with and be acquired by the solar panel end effector 124. In some examples, the third link 128 can be eliminated altogether. Alternatively, the third link 128 and the solar panel end effector 124 can be actuated, as in the examples of FIGS. 3-7 and 10A-11B, relative to the rest of the robotic arm 116. However, the range of actuation of the third link 128 and the solar panel end effector 124 can be much less than the examples shown in FIGS. 3-7 and 10A-11B. For example, in FIGS. 12A-15, the linear actuation of the third link 128 and the solar panel end effector 124 does not need to extend into the hopper to acquire all of the solar panels. Instead, the third link 128 and the solar panel end effector 124 can be actuated to linearly translate enough to acquire a lead solar panel and separate it from a solar panel adjacent to the lead solar panel to allow the lead solar panel to be lifted by the robotic arm without contacting the adjacent solar panel.

The solar panel installation device 104 can further include a solar panel separator mechanism. As described above, it can be advantageous to space out the solar panels 112 in the hopper so that damage is prevented that may be caused by adjacent solar panels colliding or scraping against each other as they are manipulated and acted upon. However, certain configurations may increase a loading time of solar panels in a hopper because each solar panel may need to be individually loaded in slots of the hopper one by one. Therefore, it is advantageous to be able to load a plurality of panels at one time into the hopper to increase efficiency of loading solar panels in to a solar panel dispensing device. Furthermore, panels are often shipped in packs containing multiple panels that are not spaced as necessary to be loaded into a hopper. Therefore, the solar panel separator mechanism 300 is described with reference to FIGS. 16A-16C in order to automate the spacing of the solar panels within the hopper.

Figure 16A:
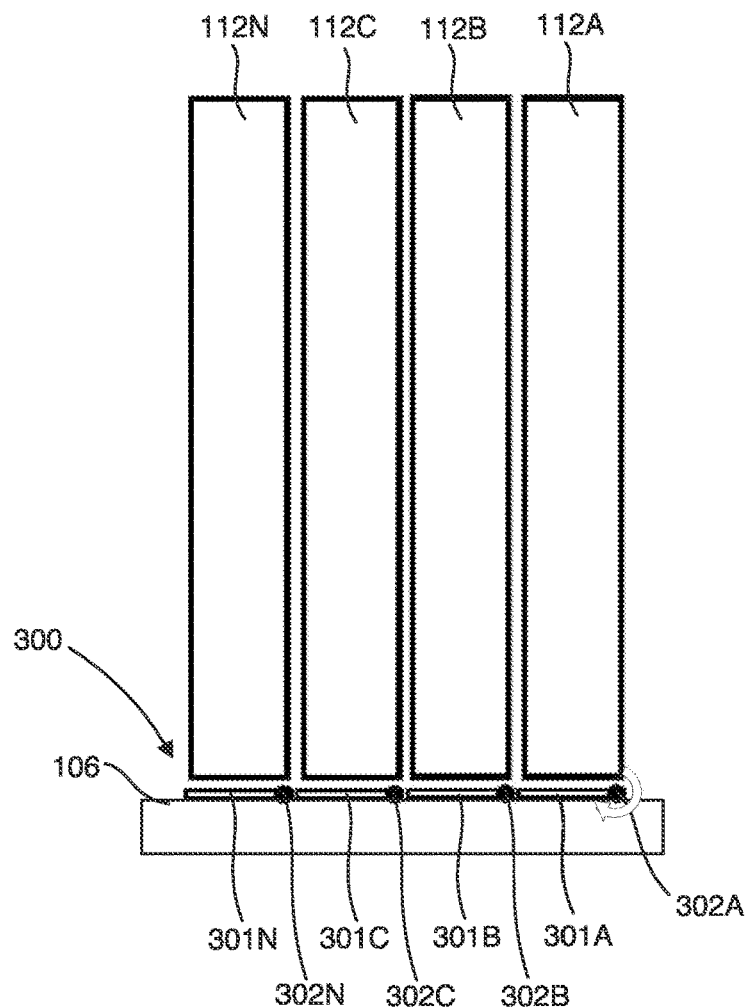
FIG. 16A illustrates a solar panel separator mechanism of a solar panel dispensing system in accordance with an example of the present disclosure.

As shown in FIG. 16A, and with reference to FIGS. 1-16A, a plurality of solar panels 112A-112N can be supported on the base 106 of a hopper. The base of the hopper can include a plurality of actuatable flippers with each flipper corresponding to a position within the hopper at which a solar panel of the plurality of solar panels is stored. For example, a flipper 301A can correspond to a solar panel 112A, a flipper 301B can correspond to a solar panel 112B, a flipper 301C can correspond to a solar panel 112C, and a flipper 301N can correspond to a solar panel 112N. It is to be understood that any number N of solar panels can be used and any number of flippers N can be added to correspond to each solar panel. Each of the flippers can be actuated to rotate about a corresponding pivot. Each of the flippers 301A-301N can respectively correspond to a pivot 302A-302N. Each of the flippers 301A-301N can be actuated simultaneously or individually by operation of either a manual device configured to rotate the flippers 301A-301N or by one or more actuators coupled to one or more pivots 302A-302N. The flippers can be made of any material, including materials that reduce friction and facilitate sliding of a solar panel on the flipper, such as a high density polyethylene.

Figure 16B:
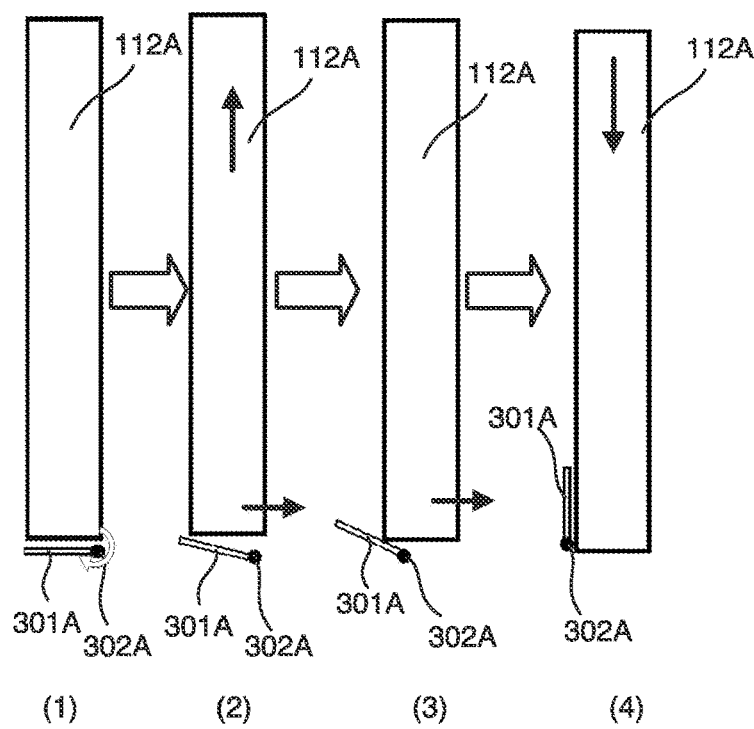
FIG. 16B illustrates steps of operation of the solar panel separator mechanism of FIG. 16A.

The operation of the flippers 301A-301N is illustrated in FIG. 16B. Four steps of the operation of flipper 301A is illustrated in FIG. 16B. In step (1), the flipper 301A is in a storage orientation. As shown, in the storage orientation, the flipper is substantially aligned with the base 106. However, the storage orientation is not so limited. The storage orientation can include any orientation in which the flipper does not extend into the interior volume of the hopper, including extending away from the hopper or extending parallel to the base. As shown in step (2), as the flipper 301A is rotated about pivot 302A, the flipper lifts the solar panel 112A upward and forward as indicated by the arrows shown in FIG. 16B. In step (3), the flipper 301A continues to be rotated about pivot 302A and the solar panel 112A slides along the flipper 301A to move further forward with respect to the flipper 301A. Finally, in step (4), the flipper ends its rotation in a spacer orientation extending into the interior volume of the hopper and substantially aligned with the solar panel 112A. In this configuration, the flipper provides support for the rear surface of the solar panel 112A. While only the operation of flipper is illustrated in FIG. 16B, it is to be understood that the each of the flippers 301A-301N operate in a similar manner.

Figure 16C:
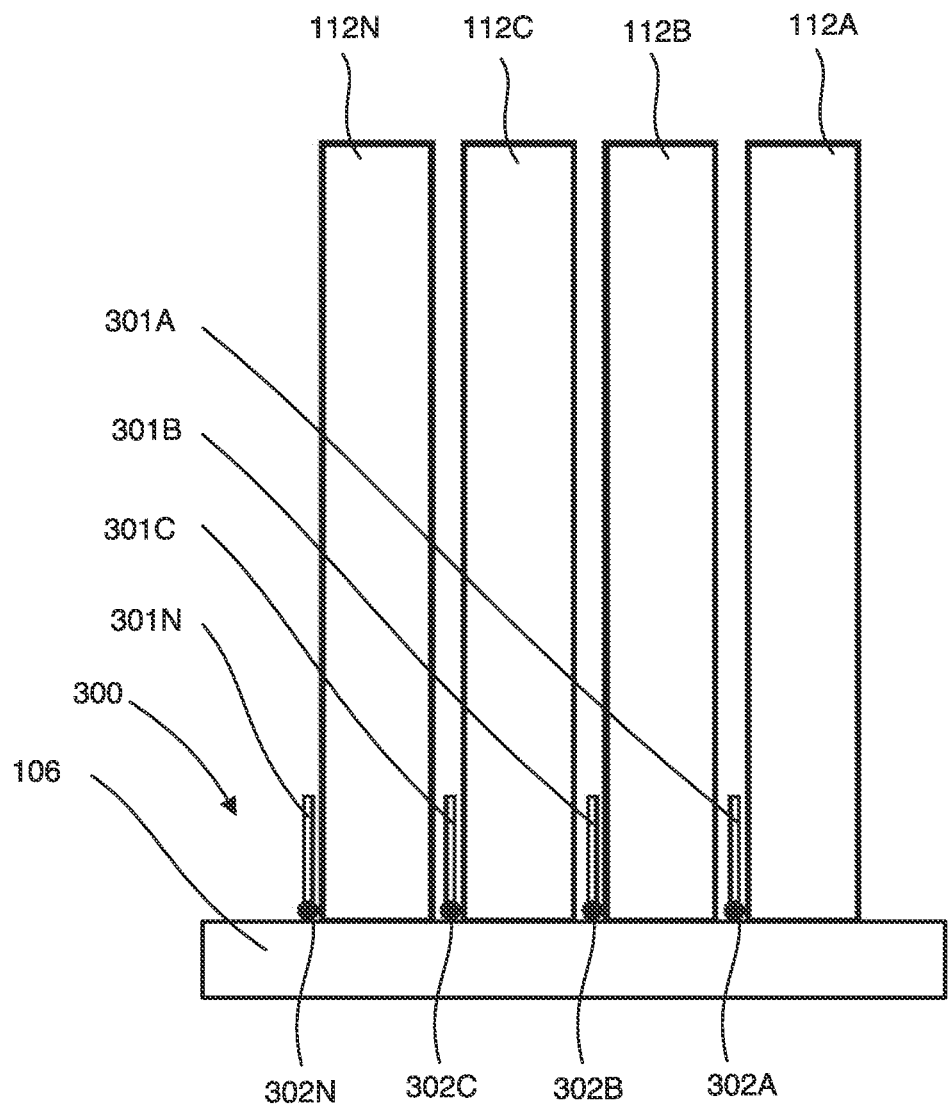
FIG. 16C further illustrates the solar panel separator mechanism of FIG. 16A.

With all flippers being rotated as shown in FIG. 16B, the flippers 301A-301N eventually arrive at the state shown in FIG. 16C. As shown, the flippers 301A-301N are all in the spacer orientation and provide spacing between the adjacent solar panels 112A-112N. The solar panels 112A-112N, as a result, rest on the base 106 with the flippers 301A-301N acting as spacers in between the solar panels. In this manner, the solar panels can be loaded in the hopper and onto the base without any spacing between them. The solar panel separator mechanism 300 can then be operated to automatically separate and space the solar panels apart from each other. This advantageously saves time when loading solar panels into a hopper by allowing a bulk stack of panels to be loaded at once, while still providing spacing between the solar panels, instead of loading the solar panels one by one into the hopper.

The flippers 301A-301N can be in fixed positions relative to the base of the hopper. Alternatively, the flippers 301A-301N can be mounted on a belt, similar to belt 195 of FIG. 15, such that the flippers can automatically separate and space out the solar panels, and can further be actuated along an axis relative to the hopper. In other words, the panel feed mechanism of FIG. 15 can be modified such that the feeder projection member 197 can be modified to be feeder projection flippers similar to flippers 301A-301N. By this modification, the feeder projection flippers can be actuated about pivots to separate the solar panels and can further be driven forward on a belt to feed the solar panels towards the robotic arm (e.g., robotic arm 116).

With returning reference to FIG. 1, the solar panel dispensing system 100 can include the solar panel installation device 104. The solar panel installation device 104 can include a guide arm 105 coupled to the support platform 130 The guide arm 105 can extend away from the support platform 130 at a position to guide a solar panel from the support platform 130 to an installation location. The installation location can be any mount, structure, position, or location in which a solar panel is desired to be installed for gathering solar energy and converting it to electricity. The solar panel installation device can further include a plurality of drive members (e.g., rollers 107) that are driveable to displace the solar panel from the support platform 130 and to drive the solar panel into the guide arm 105. The guide arm 105 can further include a plurality of arm rollers 109 that are driveable to move the solar panel through the guide arm and into an installation location. The rollers 107 and arm rollers 109 can be driven manually or can be actuated by a motor or actuator in order to drive the solar panel from the support platform 130, through the guide arm 105, and to the installation location.

Figure 17:
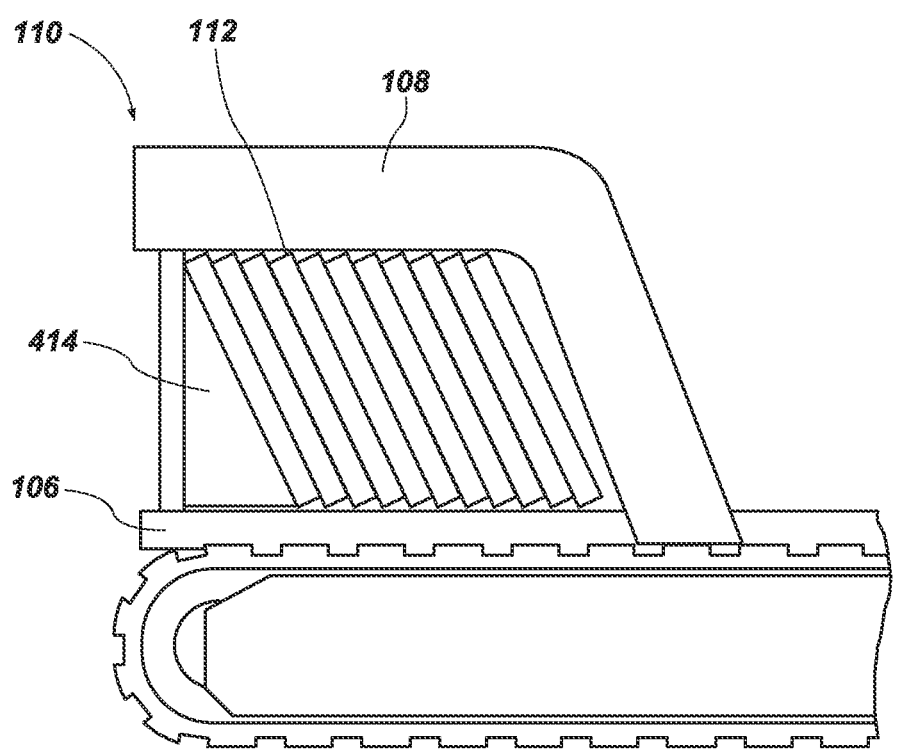
FIG. 17 illustrates a side view of a hopper of a solar panel dispensing system in accordance with an example of the present disclosure.

As described above, the upright orientation of the solar panels in the hopper need not be strictly vertical. FIG. 17 illustrates an example of panels in a hopper 110 wherein the rear support 414 is angled such that the solar panels 112 are supported on an angle within the hopper 110. However, the solar panels are still considered to be in an upright orientation since the panels rest on the base 106 of the hopper 110 and the base supports the edges of the solar panels, not the face surfaces of the solar panels, as will be appreciated by comparing FIG. 17 to FIGS. 2A-2D.

Figure 18:
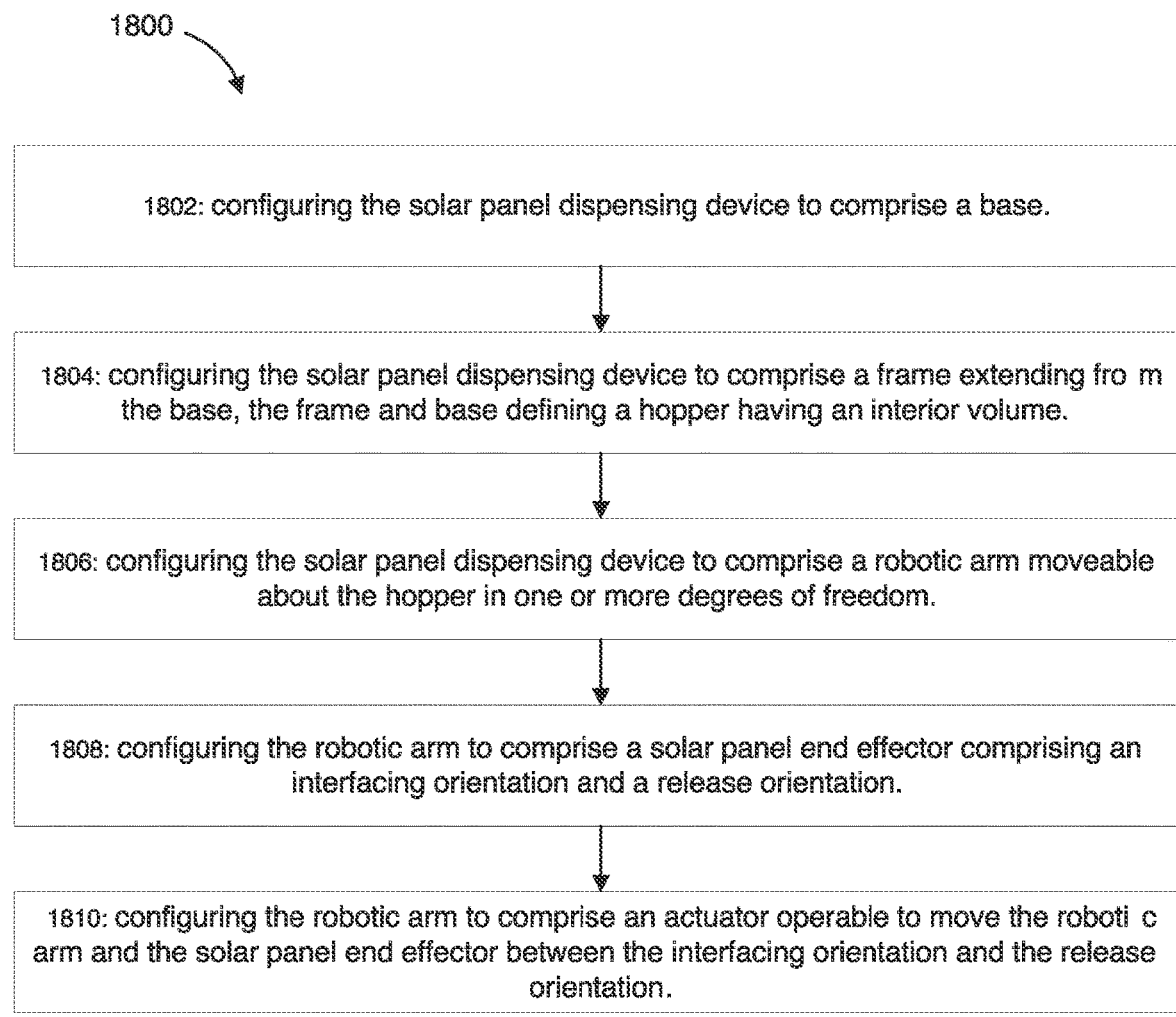
FIG. 18 illustrates a method of configuring a solar panel dispensing system in accordance with an example of the present disclosure.

Illustrated in FIG. 18 is a method 1800 of configuring a solar panel dispensing device, such as solar panel dispensing device 102 of solar panel dispensing system 100 as described above with respect to any of the FIGS. 1-17. The method 1800 can include a step 1802 of configuring the solar panel dispensing device to comprise a base. The method 1800 can further include a step 1804 of configuring the solar panel dispensing device to comprise a frame extending from the base, the frame and base defining a hopper having an interior volume, the hopper being configured to contain one or more solar panels therein with the solar panels supported in an upright orientation. The method 1800 can further include a step 1806 of configuring the solar panel dispensing device to comprise a robotic arm moveable about the hopper in one or more degrees of freedom. The robotic arm can comprise a first end supported on the hopper. The robotic arm can further comprise a second end distal to the first end. The method 1800 can further include a step 1808 of configuring the robotic arm to comprise a solar panel end effector supported on the second end, the solar panel end effector being operable to acquire a lead solar panel of the one or more solar panels oriented in the upright orientation, the solar panel end effector comprising an interfacing orientation and a release orientation. The method 1800 can further include a step 1810 of configuring the robotic arm to comprise an actuator operable to move the second end of the robotic arm and the solar panel end effector between the interfacing orientation and the release orientation. In the method 1800, the interfacing orientation of the solar panel end effector can correspond to the lead solar panel being in the upright orientation, and the release orientation of the solar panel end effector can correspond to the lead solar panel being in a presentation orientation.

Figure 19:
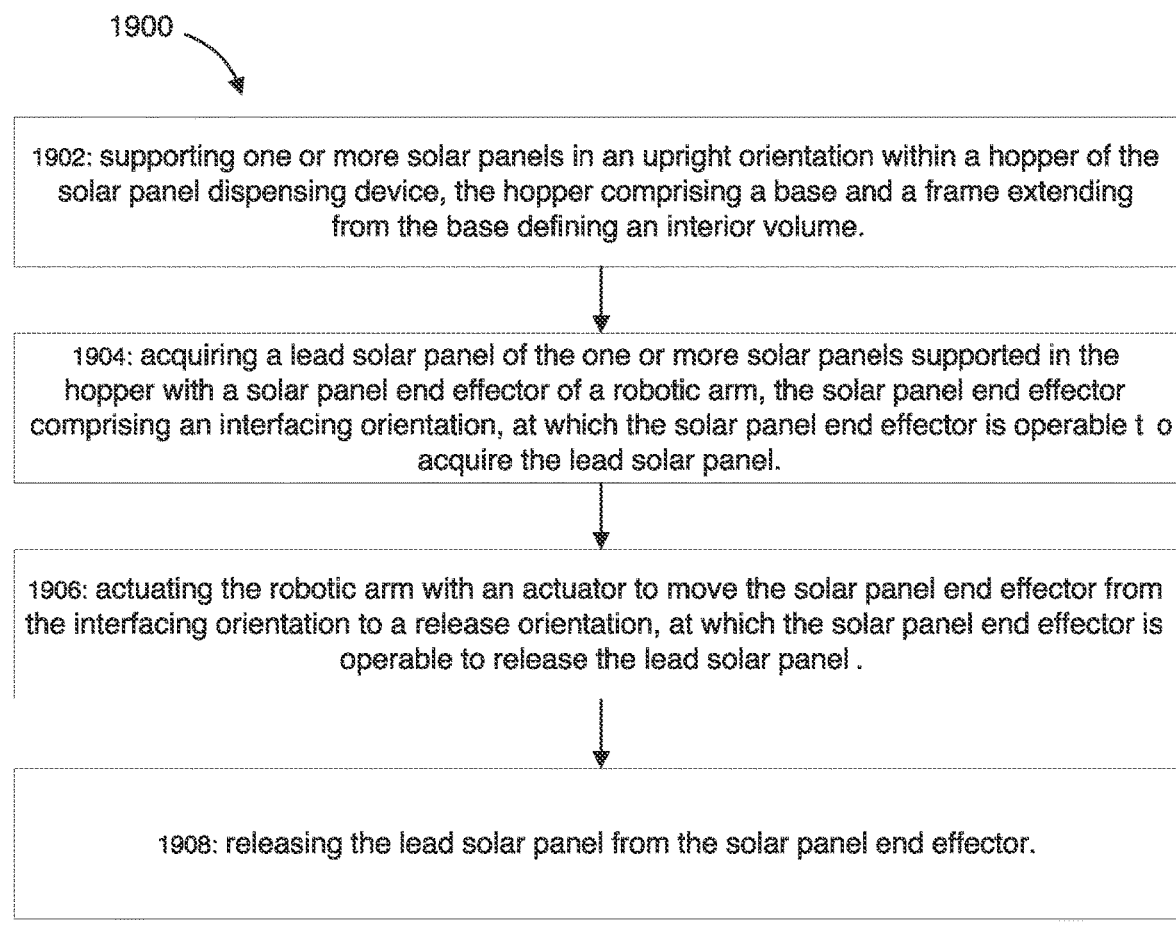
FIG. 19 illustrates a method of dispensing solar panels using a solar panel dispensing system in accordance with an example of the present disclosure.

Illustrated in FIG. 19 is a method of dispensing one or more solar panels from a solar panel dispensing device, such as the solar panel dispensing device 102 of the solar panel dispensing system 100 as described above with respect to any of FIGS. 1-17. The method 1900 can comprise a step 1902 of supporting one or more solar panels in an upright orientation within a hopper of the solar panel dispensing device, the hopper comprising a base and a frame extending from the base defining an interior volume. The method can further comprise a step 1904 of acquiring a lead solar panel of the one or more solar panels supported in the hopper with a solar panel end effector of a robotic arm, the solar panel end effector comprising an interfacing orientation, at which the solar panel end effector is operable to acquire the lead solar panel. The method can further comprise a step 1906 of actuating the robotic arm with an actuator to move the solar panel end effector from the interfacing orientation to a release orientation, at which the solar panel end effector is operable to release the lead solar panel. The method can further comprise a step 1908 of releasing the lead solar panel from the solar panel end effector. In the method, the interfacing orientation of the solar panel end effector can correspond to the lead solar panel being in the upright orientation, and the release orientation of the solar panel end effector can correspond to the lead solar panel being in a presentation orientation.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A solar panel dispensing device, comprising:
   a base;
   a frame extending from the base and comprising rear support, the frame and base defining a hopper having an interior volume, the hopper being configured to contain one or more solar panels therein with the solar panels supported in an upright orientation;
   a panel support mechanism comprising:
      a hopper projection member moveably supported by at least one of the base or the frame of the hopper, and comprising a surface configured to interface with a lead solar panel of the one or more solar panels; and
      a hopper actuator coupled to the hopper projection member and operable to move the hopper projection member toward the rear support; and
   a robotic arm moveable about the hopper in one or more degrees of freedom, the robotic arm comprising:
      a first end supported on at least one of the base, the frame, or an arm mount positioned to facilitate interaction between the robotic arm and the hopper;
      a second end distal to the first end;
      a solar panel end effector supported on the second end, the solar panel end effector being operable to acquire the lead solar panel of the one or more solar panels oriented in the upright orientation, the solar panel end effector comprising an interfacing orientation and a release orientation;
      an arm actuator operable to move the second end of the robotic arm and the solar panel end effector between the interfacing orientation and the release orientation,
      wherein the interfacing orientation of the solar panel end effector corresponds to the lead solar panel being in the upright orientation, and the release orientation of the solar panel end effector corresponds to the lead solar panel being in a presentation orientation.

2. The solar panel dispensing device of claim 1, wherein the solar panel end effector comprises at least one of a vacuum gripper, pneumatic gripper, hydraulic gripper, servo-electric gripper, adhesive gripper, electrostatic, or a magnetic gripper.

3. The solar panel dispensing device of claim 1, wherein the robotic arm comprises a plurality of links coupled together at a plurality of joints extending from the first end of the robotic arm to the solar panel end effector.

4. The solar panel dispensing device of claim 1, wherein the robotic arm comprises:
   a first link comprising a proximal end coupled to the at least one of the base, the frame, or the arm mount and a distal end opposite to the proximal end;
   a second link comprising a proximal end and a distal end opposite to the proximal end; and
   a first joint, wherein the proximal end of the second link is rotatably coupled to the distal end of the first link;
   wherein the arm actuator comprises a rotational actuator associated with the first joint and operable to rotate the second link relative to the first link.

5. The solar panel dispensing device of claim 4, wherein the robotic arm further comprises:
   a second joint, wherein the solar panel end effector is slidably coupled to the distal end of the second link;
   wherein the rotational actuator is operable to rotate the second link of the robotic arm about the first joint to move the solar panel end effector between the interfacing orientation and the release orientation.

6. The solar panel dispensing device of claim 5, further comprising a linear actuator associated with the second joint and operable to translate the solar panel end effector relative to the second link.

7. The solar panel dispensing device of claim 4, wherein the robotic arm further comprises:
   a third link comprising a proximal end and a distal end opposite to the proximal end;
   a second joint, wherein the proximal end of the third link is slidably coupled to the distal end of the second link; and
   a third joint, wherein the solar panel end effector is coupled to the distal end of the third link.

8. The solar panel dispensing device of claim 7, wherein the second joint comprises a linear actuator operable to translate the third link and the solar panel end effector relative to the second link.

9. The solar panel dispensing device of claim 7, wherein the third joint rotatably couples the solar panel end effector to the distal end of the third link.

10. The solar panel dispensing device of claim 9, further comprising an end effector actuator associated with the third joint and operable to rotate the solar panel end effector relative to the third link.

11. The solar panel dispensing device of claim 1, wherein the hopper further comprises a plurality of spacer projection members supported on at least one of the base or the frame, the plurality of spacer projections defining one or more slots each configured to receive at least one solar panel of the one or more solar panels.

12. The solar panel dispensing device of claim 1, wherein the frame of the hopper comprises a rear support positioned to support a rear solar panel of the one or more solar panels in the upright orientation in the hopper.

13. The solar panel dispensing device of claim 1, wherein the hopper actuator comprises a hopper biasing system that biases the hopper projection member toward the rear support.

14. The solar panel dispensing device of claim 1, further comprising a support platform disposed proximate the release orientation of the solar panel end effector, wherein the solar panel end effector is operable at the release orientation to release a solar panel to be supported by the support platform.

15. A solar panel dispensing system, comprising:
a solar panel dispensing device comprising:
a base;
a frame extending from the base, the frame and base defining a hopper having an interior volume, the hopper being configured to receive and support one or more solar panels in a supported orientation;
a robotic arm moveable about the hopper, the robotic arm comprising:
a first end supported on the at least one of the base, the frame, or an arm mount, the robotic arm being moveable in one or more degrees of freedom;
a solar panel end effector supported on a second end of the robotic arm, the solar panel end effector comprising an interfacing orientation and a release orientation; and
an arm actuator operable to move the second end of the robotic arm and the solar panel end effector between the interfacing orientation and the release orientation;
a mobile platform in support of the solar panel dispensing device and configured to move and maneuver about an environment; and
a support platform positioned on the mobile platform proximate the robotic arm, the support platform being configured to receive from the robotic arm and the solar panel end effector an acquired lead solar panel,
wherein the solar panel end effector is operable in the interfacing orientation to acquire the lead solar panel of the one or more solar panels supported in the hopper;
wherein the interfacing orientation of the solar panel end effector corresponds to the lead solar panel being in the supported orientation, and the release orientation of the solar panel end effector corresponds to the lead solar panel being in a presentation orientation.

16. The solar panel dispensing system of claim 15, a wherein the support platform is disposed proximate the release orientation of the solar panel end effector, wherein the solar panel end effector is operable at the release orientation to release a solar panel to be supported by the support platform.

17. The solar panel dispensing system of claim 16, further comprising:
a solar panel installation device supported on the mobile platform in proximity to the solar panel dispensing device, and comprising:
a guide arm comprising one or more support members coupled to the support platform, the guide arm extending away from the support platform at a position to guide a lead solar panel from the support platform to an installation location; and
a drive actuator driveable to displace a solar panel from the support platform into the guide arm.

18. A method of configuring a solar panel dispensing system, comprising:
configuring the solar panel dispensing device to comprise a base, and to be supported on a mobile platform;
configuring the solar panel dispensing device to comprise a frame extending from the base, the frame and base defining a hopper having an interior volume, the hopper being configured to contain one or more solar panels therein;
configuring the solar panel dispensing device to comprise a robotic arm moveable about the hopper in one or more degrees of freedom,
configuring the robotic arm to comprise a first end supported on the at least one of the base, the frame, or an arm mount;
configuring the robotic arm to comprise a second end distal to the first end;
configuring the robotic arm to comprise a solar panel end effector supported on the second end, the solar panel end effector being operable to acquire a lead solar panel of the one or more solar panels, the solar panel end effector comprising an interfacing orientation and a release orientation;
configuring the robotic arm to comprise an actuator operable to move the second end of the robotic arm and the solar panel end effector between the interfacing orientation and the release orientation; and
configuring the robotic arm of the solar panel dispensing device to dispense the lead solar panel into a solar panel installation device supported on the mobile platform in a position adjacent the solar panel dispensing device,
wherein the interfacing orientation of the solar panel end effector corresponds to an orientation of the lead solar panel as supported within the hopper, and the release orientation of the solar panel end effector corresponds to the lead solar panel being in a presentation orientation.

19. A method of dispensing one or more solar panels from a solar panel dispensing system, comprising:
positioning a solar panel dispensing device via a mobile platform in support of the solar panel dispensing device;
supporting one or more solar panels in an upright orientation within a hopper of the solar panel dispensing device, the hopper comprising a base and a frame extending from the base defining an interior volume;
acquiring a lead solar panel of the one or more solar panels supported in the hopper with a solar panel end effector of a robotic arm, the solar panel end effector comprising an interfacing orientation, at which the solar panel end effector is operable to acquire the lead solar panel;

actuating the robotic arm with an actuator to move the solar panel end effector from the interfacing orientation to a release orientation, at which the solar panel end effector is operable to release the lead solar panel to a solar panel installation device supported on the mobile platform in a position adjacent the solar panel dispensing device;

wherein the interfacing orientation of the solar panel end effector corresponds to the lead solar panel being in the upright orientation, and the release orientation of the solar panel end effector corresponds to the lead solar panel being in a presentation orientation.

20. A solar panel dispensing device, comprising:
a base;
a frame extending from the base, the frame and base defining a hopper having an interior volume, the hopper being configured to contain one or more solar panels therein with the solar panels supported in an upright orientation, the frame further comprising a panel feed mechanism comprising a solar panel interface member moveably coupled to the hopper; and a feed actuator operable to bi-directionally move the solar panel interface member along an axis relative to the hopper;
a robotic arm moveable about the hopper in one or more degrees of freedom, the robotic arm comprising:
  a first end supported on at least one of the base, the frame, or an arm mount positioned to facilitate interaction between the robotic arm and the hopper;
  a second end distal to the first end;
  a solar panel end effector supported on the second end, the solar panel end effector being operable to acquire a lead solar panel of the one or more solar panels oriented in the upright orientation, the solar panel end effector comprising an interfacing orientation and a release orientation;
  an arm actuator operable to move the second end of the robotic arm and the solar panel end effector between the interfacing orientation and the release orientation,
wherein the interfacing orientation of the solar panel end effector corresponds to the lead solar panel being in the upright orientation, and the release orientation of the solar panel end effector corresponds to the lead solar panel being in a presentation orientation.

21. The solar panel dispensing device of claim 20, wherein the feed actuator comprises a feed biasing system that biases the solar panel interface member in a direction along the axis relative to the hopper.

22. The solar panel dispensing device of claim 20, wherein the panel feed mechanism further comprises a threaded rod coupled to the solar panel interface member;
wherein the feed actuator is operable to rotate the threaded rod to bi-directionally move the solar panel interface member along the axis relative to the hopper.

23. The solar panel dispensing device of claim 20, the panel feed mechanism further comprising a plurality of rollers, wherein the feed actuator is operable to drive one or more of the plurality of rollers; and
  wherein the solar panel interface member of the panel feed mechanism comprises a belt in contact with one or more of the rollers such that operation of the feed actuator drives one or more of the rollers to drive a portion of the belt along the axis relative to the hopper.

24. The solar panel dispensing device of claim 23, wherein the belt comprises at least one feeder projection member extending outward from a surface of the belt, the at least one projection member being configured to drive the solar panel along the axis relative to the hopper during operation of the panel feed mechanism.

25. The solar panel dispensing device of claim 23, wherein the belt comprises a plurality of spacer projections extending outward from a surface of the belt, the plurality of projection members being spaced about the surface of the belt at distances to accommodate a solar panel between adjacent spacer projections.

26. A solar panel dispensing device, comprising:
a base;
a frame extending from the base, the frame and base defining a hopper having an interior volume, the hopper being configured to contain one or more solar panels therein with the solar panels supported in an upright orientation, the frame further comprising a solar panel separator mechanism comprising:
  a flipper pivotably coupled to the base of the hopper, the flipper corresponding to a position within the hopper configured to receive a solar panel, wherein the flipper comprises a storage orientation, in which the flipper is aligned with the base or extends away from the interior volume of the hopper, and a spacer orientation, in which the flipper extends into the hopper; and
  a flipper actuator operable to rotate the flipper relative to the base of the hopper from the storage orientation to the spacer orientation; and
a robotic arm moveable about the hopper in one or more degrees of freedom, the robotic arm comprising:
  a first end supported on at least one of the base, the frame, or an arm mount positioned to facilitate interaction between the robotic arm and the hopper;
  a second end distal to the first end;
  a solar panel end effector supported on the second end, the solar panel end effector being operable to acquire a lead solar panel of the one or more solar panels oriented in the upright orientation, the solar panel end effector comprising an interfacing orientation and a release orientation; and
  an arm actuator operable to move the second end of the robotic arm and the solar panel end effector between the interfacing orientation and the release orientation,
wherein the interfacing orientation of the solar panel end effector corresponds to the lead solar panel being in the upright orientation, and the release orientation of the solar panel end effector corresponds to the lead solar panel being in a presentation orientation.

27. The solar panel dispensing device of claim 26, wherein the solar panel separator mechanism further comprises a plurality of flippers each corresponding to one of a plurality of positions within the hopper configured to receive a solar panel, wherein each of the plurality of flippers comprises a storage orientation and a spacer orientation; and
  one or more flipper actuators, each operable to rotate one or more of the plurality of flippers relative to the base of the hopper from the storage orientation to the spacer orientation.

* * * * *